United States Patent
Abe et al.

(10) Patent No.: US 10,164,293 B2
(45) Date of Patent: Dec. 25, 2018

(54) NONAQUEOUS ELECTROLYTE AND ELECTRICITY STORING DEVICE IN WHICH SAME IS USED

(71) Applicant: Ube Industries, Ltd., Yamaguchi (JP)

(72) Inventors: Koji Abe, Yamaguchi (JP); Kei Shimamoto, Yamaguchi (JP); Shoji Shikita, Yamaguchi (JP)

(73) Assignee: UBE INDUSTRIES, LTD., Yamaguchi (JP)

( * ) Notice: Subject to any disclaimer, the term of this patent is extended or adjusted under 35 U.S.C. 154(b) by 195 days.

(21) Appl. No.: 15/315,273

(22) PCT Filed: May 28, 2015

(86) PCT No.: PCT/JP2015/065356
§ 371 (c)(1),
(2) Date: Nov. 30, 2016

(87) PCT Pub. No.: WO2015/182690
PCT Pub. Date: Dec. 3, 2015

(65) Prior Publication Data
US 2017/0194664 A1  Jul. 6, 2017

(30) Foreign Application Priority Data

May 30, 2014  (JP) ................... 2014-111816
Nov. 25, 2014  (JP) ................... 2014-237753

(51) Int. Cl.
| | |
|---|---|
| *H01M 10/0568* | (2010.01) |
| *H01M 10/05* | (2010.01) |
| *H01M 10/052* | (2010.01) |
| *H01M 10/0567* | (2010.01) |
| *H01M 10/0569* | (2010.01) |
| *H01M 6/16* | (2006.01) |
| *H01G 11/06* | (2013.01) |
| *H01G 11/64* | (2013.01) |
| *H01G 11/60* | (2013.01) |
| *H01G 11/62* | (2013.01) |

(52) U.S. Cl.
CPC ........ *H01M 10/0568* (2013.01); *H01G 11/06* (2013.01); *H01G 11/64* (2013.01); *H01M 6/168* (2013.01); *H01M 10/05* (2013.01); *H01M 10/052* (2013.01); *H01M 10/0567* (2013.01); *H01M 10/0569* (2013.01); *H01G 11/60* (2013.01); *H01G 11/62* (2013.01); *H01M 6/164* (2013.01); *H01M 6/166* (2013.01); *H01M 2300/0034* (2013.01); *Y02E 60/13* (2013.01); *Y02T 10/7011* (2013.01); *Y02T 10/7022* (2013.01)

(58) Field of Classification Search
CPC ............. H01M 10/0568; H01M 10/05; H01M 10/052; H01M 10/0567; H01M 10/0569; H01M 6/168; H01M 6/164; H01M 6/166; H01M 2300/034; H01G 11/06; H01G 11/64; H01G 11/60; H01G 11/62; Y02E 60/13; Y02T 10/7011; Y02T 10/7022
See application file for complete search history.

(56) References Cited

U.S. PATENT DOCUMENTS

| | | | | |
|---|---|---|---|---|
| 7,985,502 | B2* | 7/2011 | Abe ............... | H01M 10/0567 429/200 |
| 2008/0241704 | A1 | 10/2008 | Abe et al. | |
| 2009/0053598 | A1* | 2/2009 | Abe ............... | H01M 10/052 429/199 |
| 2014/0342221 | A1* | 11/2014 | Bomkamp ....... | C07C 68/02 429/188 |

FOREIGN PATENT DOCUMENTS

| | | |
|---|---|---|
| JP | 7-192762 A | 7/1995 |
| JP | 2010-86915 A | 4/2010 |
| JP | 2012216387 A * | 11/2012 |
| WO | 2005/091422 A1 | 9/2005 |

OTHER PUBLICATIONS

International Search Report for PCT/JP2015/065356 dated Aug. 11, 2015.

* cited by examiner

*Primary Examiner* — Gregg Cantelmo
(74) *Attorney, Agent, or Firm* — Kenealy Vaidya LLP

(57) ABSTRACT

Disclosed are a non-aqueous electrolytic solution, which can improve cycle characteristics when a power storage device is used at high temperature and high voltage, and a power device using the same. The non-aqueous electrolytic solution according to the present invention comprises, in addition to a non-aqueous solvent and an electrolyte salt dissolved therein, a compound represented by the following formula (I):

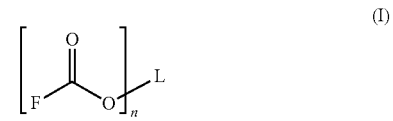

(I)

wherein n is an integer of 1 or 2; and when n is 1, L represents a straight or branched unsaturated hydrocarbon group of which at least one hydrogen atom is optionally substituted by a halogen atom, a cycloalkyl group of which at least one hydrogen atom is optionally substituted by a halogen atom, or an aryl group of which at least one hydrogen atom is optionally substituted by a halogen atom; and when n is 2, L represents a saturated or unsaturated divalent hydrocarbon group which optionally contains ether bond(s), or an arylene group.

20 Claims, No Drawings

NONAQUEOUS ELECTROLYTE AND ELECTRICITY STORING DEVICE IN WHICH SAME IS USED

This application is a U.S. national phase filing under 35 U.S.C. § 371 of PCT Application No. PCT/JP2015/065356, filed May 28, 2015, and which in turn claims priority under 35 U.S.C. § 119 to Japanese Patent Application Nos. JP2014-111816 and JP2014-237753, filed May 30, 2014 and Nov. 25, 2014 respectively, the entireties of which are incorporated by reference herein.

TECHNICAL FIELD

The present invention relates to a non-aqueous electrolytic solution for a power storage device, and, more specifically, relates to a non-aqueous electrolytic solution which can improve electrochemical characteristics when the power storage device is used at high voltage, and a power storage device using the same.

BACKGROUND ART

In recent years, power storage devices, in particular lithium ion rechargeable batteries have become used extensively as a power source for electronic equipment such as portable phones, notebook computers, and etc., or as a power source for electric automobiles and electric power storage applications. In particular, laminate type batteries and square type batteries, which use laminated films such as an aluminum laminated film as an exterior member are equipped for many thin electronic devices such as tablet terminals, thin notebook computers, and the like. Since these batteries are thin, they might be easily deformed by small expansion and the like, and there is an issue that the deformation affects the electronic devices. Therefore, deformation of these batteries are to be suppressed.

The lithium ion rechargeable battery is basically composed of a positive electrode and a negative electrode containing a material which can occlude and release lithium, and a non-aqueous electrolytic solution composed of a lithium salt and a non-aqueous solvent, the non-aqueous solvent being a carbonate such as ethylene carbonate (EC) and propylene carbonate (PC).

Furthermore, as materials for the negative electrode of the lithium ion rechargeable battery, a lithium metal, metal compounds which can occlude and release lithium (a metal simple substance, oxides, alloys with lithium, and the like), and carbon materials. In particular, non-aqueous electrolyte secondary batteries using, for example, coke and graphite (artificial graphite or natural graphite) among the carbon materials are widely put to practical use. As the negative electrode comprising these carbon materials stores and releases lithium and electrons at an extremely low potential equivalent to lithium metal, there is a possibility that many solvents are subjected to reductive decomposition. Therefore, irrespective of the kind of the negative electrode, a part of the solvent in the electrolytic solution is reductively decomposed on the negative electrode and, due to deposition of the decomposed product, generation of gas, and swelling of the electrode, migration of lithium ions is interfered and there arises a possibility that battery characteristics deteriorate, in particular a possibility that battery characteristics such as cycle characteristics and the like deteriorate, particularly when the battery is used at high temperature and high voltage. Furthermore, lithium ion rechargeable batteries having a negative electrode which is made of lithium metal, alloys of lithium metals, simple substances of tin, silicon and the like, and oxides of the simple substances can provide a high initial capacitance, but on the other hand, sometimes causes the progress of particle size reduction during cycling so that it is known that the reductive decomposition of the non-aqueous solvent occurs at an accelerated rate in comparison with the negative electrode made of a carbon material, resulting in significant deterioration of battery performance such as battery capacity and cycle characteristics, and the battery deforms due to swelling of the electrode.

On the other hand, materials which can occlude and release lithium such as $LiCoO_2$, $LiMn_2O_4$, $LiNiO_2$ and $LiFePO_4$, used as positive electrode materials, occlude and release lithium and electrons at a high voltage of 3.5 V or more based on lithium, and therefore there is a possibility that many solvents are subjected to oxidative decomposition, particularly when the battery is used at high temperature and high voltage. Therefore, irrespective of a kind of the positive electrode, there are concerns that a part of the solvent in the electrolytic solution is oxidatively decomposed on the positive electrode to cause a resistance increase due to deposition of the decomposed product and that gas is generated due to decomposition of the solvent to cause swelling of the battery.

Meanwhile, in electronic equipment loaded with a lithium ion rechargeable battery, power consumption keeps increasing and a battery capacity continues to become larger. Accordingly, heat evolution from the electronic equipment also becomes a factor to accelerate temperature rise of the battery. This makes an environment for the electrolytic solution easier to cause decomposition together with a shift of the set charging voltage of the battery to a higher value. Situations must be avoided that the battery becomes swollen due to gas generation caused by decomposition of the electrolytic solution and that the battery becomes unusable due to operation of a safety mechanism such as current cut-off and the like.

Further, multi-functionalization of electronic equipment also advances more and more, and there is a tendency for power consumption to increase. Therefore, there is a demand for making the capacity of the lithium ion rechargeable battery higher and, for that purpose, density of the electrode is increased and a wasteful space volume inside the battery is reduced to make a volume occupied by the non-aqueous electrolytic solution within the battery smaller. Therefore, the situation is such that battery performance, when the battery is used at high temperature and high voltage, is liable to be deteriorated by a small amount of decomposition of the non-aqueous electrolyte.

There have been proposed various non-aqueous electrolytic solutions. For example, WO 2005/091422 (PTL 1) proposes a non-aqueous electrolytic solution comprising formates such as phenyl formate, biphenyl formate, and the like, which is described to improve cycle characteristics, electric capacity, and storage characteristics of the battery. Furthermore, JP H7 (1995)-192762A (PTL 2) discloses a non-aqueous electrolytic solution comprising propyl fluoroformate, which is described to improve high load characteristics, low temperature characteristics, and cycle characteristics of the battery. Despite the presence of conventional non-aqueous electrolytic solutions including these, there is still a demand for a non-aqueous electrolytic solution which can realize a power storage device of high performance.

CITATION LIST

Patent Literature

[PTL 1] WO 2005/091422
[PTL 2] JP-H7 (1995)-192762A

SUMMARY OF THE INVENTION

We have now found that an addition of a specific fluoroformate compound realizes a non-aqueous electrolytic solution which can improve performance of a power storage device, in particular cycle characteristics when the device is used at high temperature and high voltage. The present invention has been made based on this finding.

Accordingly, an object of the present invention is to provide a non-aqueous electrolytic solution which can improve cycle characteristics when a power storage device is used at high temperature and high voltage, and also to provide a power storage device using the non-aqueous electrolytic solution.

According to the present invention, a non-aqueous electrolytic solution comprises at least a non-aqueous solvent, an electrolyte salt dissolved in the non-aqueous solvent, and at least one compound represented by general formula (I):

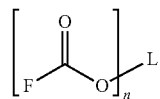 (I)

wherein n is an integer of 1 or 2; and when n is 1, L represents a straight or branched unsaturated hydrocarbon group that has 2 to 10 carbon atoms and of which at least one hydrogen atom is optionally substituted by a halogen atom, a cycloalkyl group that has 3 to 10 carbon atoms and of which at least one hydrogen atom is optionally substituted by a halogen atom, or an aryl group that has 6 to 20 carbon atoms and of which at least one hydrogen atom is optionally substituted by a halogen atom; and when n is 2, L represents a saturated or unsaturated divalent hydrocarbon group that has 2 to 12 carbon atoms and optionally contains ether bond(s), or an arylene group having 6 to 20 carbon atoms.

Furthermore, the power storage device according to the present invention is a power storage device comprising at least a positive electrode, a negative electrode, and a non-aqueous electrolytic solution containing an electrolyte salt dissolved in a non-aqueous solvent, wherein the non-aqueous electrolytic solution is the non-aqueous electrolytic solution according to the present invention.

According to the present invention, there are provided: a non-aqueous electrolytic solution which can improve performance of a power storage device, particularly cycle characteristics when the device is used at high temperature and high voltage; and a power storage device such as a lithium battery and the like using the electrolytic solution.

DESCRIPTION OF THE INVENTION

[Non-Aqueous Electrolytic Solution]

The non-aqueous electrolytic solution according to the present invention comprises the compound represented by general formula (I).

The compound contained in the non-aqueous electrolytic solution of the present invention is represented by general formula (I):

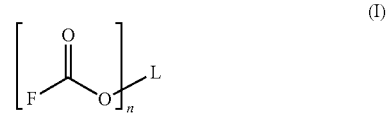

wherein n is an integer of 1 or 2; and when n is 1, L represents a straight or branched unsaturated hydrocarbon group that has 2 to 10 carbon atoms and of which at least one hydrogen atom is optionally substituted by a halogen atom, a cycloalkyl group that has 3 to 10 carbon atoms and of which at least one hydrogen atom is optionally substituted by a halogen atom, or an aryl group that has 6 to 20 carbon atoms and of which at least one hydrogen atom is optionally substituted by a halogen atom; and when n is 2, L represents a saturated or unsaturated divalent hydrocarbon group that has 2 to 12 carbon atoms and optionally contains ether bond(s), or an arylene group that has 6 to 20 carbon atoms.

In a power storage device, in particular a lithium ion rechargeable battery using a non-aqueous electrolytic solution containing a compound represented by general formula (I), electrochemical characteristics are improved and, in particular, cycle characteristics of the battery when used at high temperature and high voltage are remarkably improved. The reason why the present invention provides such an effect is not clear but is believed to be as follows. The following theory is however an assumption and is not intended in any way to limit the present invention. It is known that, in a power storage device such as a lithium ion rechargeable battery, components of the electrolytic solution are exposed to an oxidative or a reductive environment on an electrode surface at the time of storing and discharging power, and a part of the components decompose and form a film on the electrode surface. This film is called an SEI (Solid Electrolyte Interface) film in some cases and may lead to deterioration of battery performance, but there are cases when this film functions as one which prevents deterioration of battery performance by suppressing subsequent decomposition of the components of the electrolytic solution. However, there is not yet enough knowledge on generation of this film and a function thereof. Further, it was observed that, even when a film which prevents deterioration of battery performance is formed once, in many cases, this film (partially) decomposes or changes in its structure under high temperature and high voltage to lose the favorable function. As a result, the cycle characteristics when the battery is used at high temperature and high voltage deteriorate. In the present invention, the compound represented by general formula (I) forms a stable film on the electrodes, in particular a negative electrode (particularly a graphite electrode), and this film is stable even at high temperature (for example, 65° C.). As a result, it is thought that the cycle characteristics can be maintained without deterioration even when the battery is used at high temperature and high voltage, and compared to other electrolytic solutions, the electrolytic solution of the present invention can improve the cycle characteristics remarkably.

In the present invention, the term "film" shall refer widely to films formed on electrode surfaces including the SEI film as a result of storing and discharging power, and when simply referred to as the "film" in the present description, it shall refer to these films formed on the electrode surfaces.

According to an embodiment of the present invention, when n is 1 in general formula (I), L is preferably a straight or branched unsaturated hydrocarbon group that has 3 to 8 carbon atoms and at least one hydrogen atom of which is optionally substituted by a halogen atom, a cycloalkyl group that has 4 to 8 carbon atoms and at least one hydrogen atom of which is optionally substituted by a halogen atom, or an aryl group that has 6 to 14 carbon atoms and at least one hydrogen atom of which is optionally substituted by a halogen atom; and more preferable is a straight or branched unsaturated hydrocarbon group having 3 to 6 carbon atoms, a cycloalkyl group having 5 to 7 carbon atoms, or an aryl group that has 6 to 10 carbon atoms and at least one hydrogen atom of which is optionally substituted by a halogen atom.

According to other embodiment of the present invention, when n is 2 in general formula (I), L is preferably a saturated or unsaturated hydrocarbon group that has 2 to 8 carbon atoms and optionally contains ether bond(s) or an arylene group having 6 to 12 carbon atoms; and more preferable is an unsaturated hydrocarbon group having 2 to 6 carbon atoms or an arylene group having 6 to 8 carbon atoms.

In general formula (I), specific examples of the C2-C10 straight or branched unsaturated hydrocarbon group include straight or branched C2-10 (preferably C3-8, more preferably C3-6) alkenyl groups and straight or branched C2-10 (preferably C3-8, more preferably C3-6) alkynyl groups.

One or more hydrogen atoms on these alkenyl groups or alkynyl groups are optionally substituted by halogen atom(s), and the halogen atom preferably includes fluorine, chlorine, bromine, or iodine, and more preferably fluorine or chlorine.

In general formula (I), the halogen atoms as a substituent of the cycloalkyl group preferably includes fluorine, chlorine, bromine, or iodine, and more preferably fluorine or chlorine.

In general formula (I), specific examples of the aryl group having 6 to 20 carbon atoms preferably include a phenyl group, a tolyl group, a xylyl group, a biphenylyl group, a naphthyl group, an anthryl group, and a phenanthryl group. One or more hydrogen atoms on an aromatic ring of this aryl group or a substituent which is substituted on the aromatic ring are optionally substituted by halogen atoms, and the halogen atom as this substituent preferably includes fluorine, chlorine, bromine, or iodine, and more preferably fluorine or chlorine.

Further, according to other embodiment of the present invention, this aryl group is preferably a phenyl group or a phenyl group substituted with one or more straight or branched alkyl groups (preferably straight or branched C1-6 alkyl groups). Furthermore, one or more hydrogen atoms on a benzene ring of this phenyl group, and one or more hydrogen atoms on an alkyl group substituted on this benzene ring are optionally substituted by halogen atom(s), and the halogen atom as the substituent preferably includes fluorine, chlorine, bromine, or iodine, and more preferably fluorine or chlorine.

In general formula (I), specific examples of the saturated or unsaturated divalent hydrocarbon group having 2 to 12 carbon atoms include straight or branched C2-12 (preferably C2-8) alkylene groups, straight or branched C2-12 (preferably C2-8) alkenylene groups, and straight or branched C2-12 (preferably C2-8) alkynylene groups. These groups may preferably contain one or two ether groups, i.e., any of —$CH_2$— in these groups can be optionally substituted by —O—.

In general formula (I), specific examples of the saturated or unsaturated divalent hydrocarbon group having 2 to 12 carbon atoms also include C2-12 cycloalkylene groups, and preferably C3-10 cycloalkylene groups.

In general formula (I), the arylene groups having 6 to 20 carbon atoms preferably include a phenylene group, a tolylene group (methylphenylene group), a dimethylphenylene group, a xylylene group (dimethylphenylene group), a biphenylylene group, a naphthylene group, an anthrylene group, and a phenanthrylene group. According to other embodiment of the present invention, this arylene group is preferably a phenylene group or a naphthylene group, or a phenylene group or naphthylene group substituted with one or more straight or branched alkyl groups (preferably straight or branched C1-6 alkyl groups, and more preferably C1-4 alkyl groups).

When n is 1 in general formula (I), specific examples of L suitably include: straight alkenyl groups such as a 2-propenyl group, a 2-butenyl group, a 3-butenyl group, a 4-pentenyl group, a 5-hexenyl group, a 6-heptenyl group, a 7-octenyl group, or the like; branched alkenyl groups such as a propen-2-yl group, a 1-methyl-2-propenyl group, a 2-methyl-1-propenyl group, a 3-methyl-2-butenyl group, or the like; straight alkynyl groups such as a 2-propynyl group, a 2-butynyl group, a 3-butynyl group, a 4-pentynyl group, a 5-hexynyl group, a 6-heptynyl group, 7-octynyl group, or the like; branched alkynyl groups such as a 1-methyl-2-propynyl group, a 1,1-dimethyl-2-propynyl group, or the like; halogenated alkenyl groups such as a 3,3-difluoro-2-propenyl group, a 4,4-difluoro-3-butenyl group, a 5,5-difluoro-4-pentenyl group, a 3,3-dichloro-2-propenyl group, a 4,4-dichloro-3-butenyl group, a 5,5-dichloro-4-pentenyl group, or the like; cycloalkyl groups such as a cyclopropyl group, a cyclobutyl group, a cyclopentyl group, a cyclohexyl group, a cycloheptyl group, cyclooctyl group, or the like; halogenated cycloalkyl groups such as a 4-fluorocyclohexyl group, a 4-chlorocyclohexyl group, or the like; or aryl groups such as a phenyl group, a 2-methylphenyl group, a 3-methylphenyl group, a 4-methylphenyl group, a 2,3-dimethylphenyl group, a 2,5-dimethylphenyl group, a 3,5-dimethylphenyl group, a 2,4,6-trimethylphenyl group, a 3-tert-butylphenyl group, a 4-tert-butylphenyl group, a 2-chlorophenyl group, a 3-chlorophenyl group, a 4-chlorophenyl group, a 2-fluorophenyl group, a 3-fluorophenyl group, a 4-fluorophenyl group, a 2-trifluoromethylphenyl group, a 3-trifluoromethylphenyl group, a 4-trifluoromethylphenyl group, 4-fluoro-2-trifluoromethylphenyl group, a 4-fluoro-3-trifluoromethylphenyl group, a 2,4-difluorophenyl group, a 2,6-difluorophenyl group, a 3,4-difluorophenyl group, a 3,5-difluorophenyl group, a 2,4-dichlorophenyl group, a 2,6-dichlorophenyl group, a 3,4-dichlorophenyl group, a 3,5-dichlorophenyl group, a 2,4,6-trifluorophenyl group, a 2,3,5,6-tetrafluorophenyl group, a perfluorophenyl group, or the like. Among these, preferable are a 2-propenyl group, a 2-butenyl group, a 3-butenyl group, a 4-pentenyl group, a 5-hexenyl group, a 1-methyl-2-propenyl group, a 3-methyl-2-butenyl group, a 2-propynyl group, a 2-butynyl group, a 3-butynyl group, a 4-pentynyl group, a 5-hexynyl group, a 1-methyl-2-propynyl group, a 3,3-difluoro-2-propenyl group, a 4,4-difluoro-3-butenyl group, a 3,3-dichloro-2-propenyl group, a 4,4-dichloro-3-butenyl group, a cyclobutyl group, a cyclopentyl group, a cyclohexyl group, a cycloheptyl group, a phenyl group, a 2-methylphenyl group, a 4-methylphenyl group, a 4-tert-butylphenyl group, a 2-chlorophenyl group, a 4-chlorophenyl group, a 2-fluorophenyl group, a 4-fluorophenyl group, a 2-trifluoromethylphenyl group, a 4-trifluoromethylphenyl group, or a perfluorophenyl group, and more preferable are a 2-butenyl group, a 3-butenyl group, a 4-pentenyl group, a 2-propynyl group, a 2-butynyl group, a 3-butynyl group, a phenyl group, a 4-tert-butylphenyl group, a 2-chlorophenyl group, a 4-chlorophenyl group, a 2-fluorophenyl group, a 4-fluorophenyl group, or a 2-trifluoromethylphenyl group.

When n is 1 in general formula (I), preferred compounds are as follows:

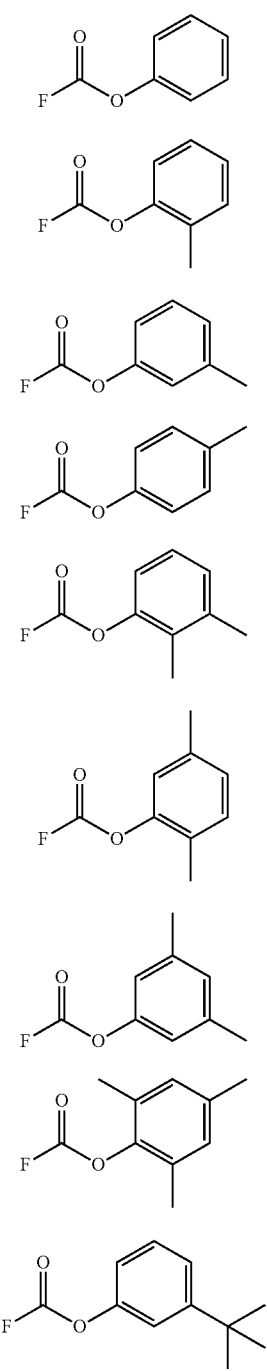

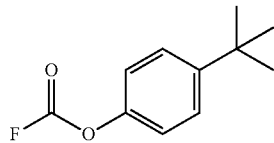

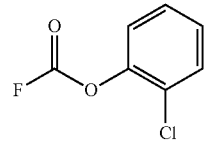

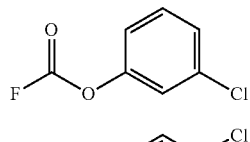

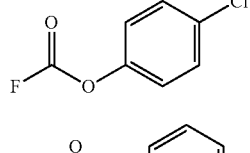

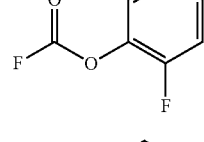

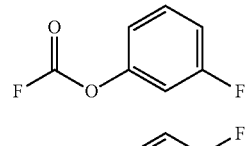

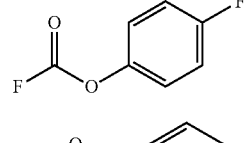

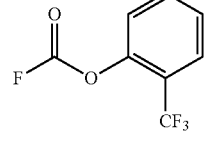

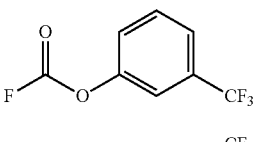

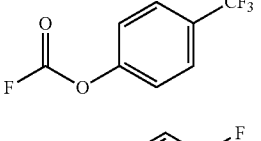

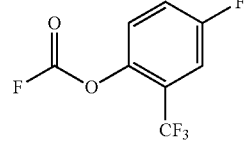

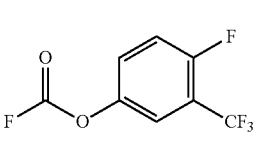

| | |
|---|---|
| | A22 |
| | A23 |
| | A24 |
| | A25 |
| | A26 |
| | A27 |
| | A28 |
| | A29 |
| | A30 |
| | A31 |
| | A32 |
| | B1 |
| | B2 |
| | B3 |
| | B4 |
| | B5 |
| | B6 |
| | B7 |
| | B8 |
| | B9 |
| | B10 |
| | B11 |
| | B12 |
| | B13 |

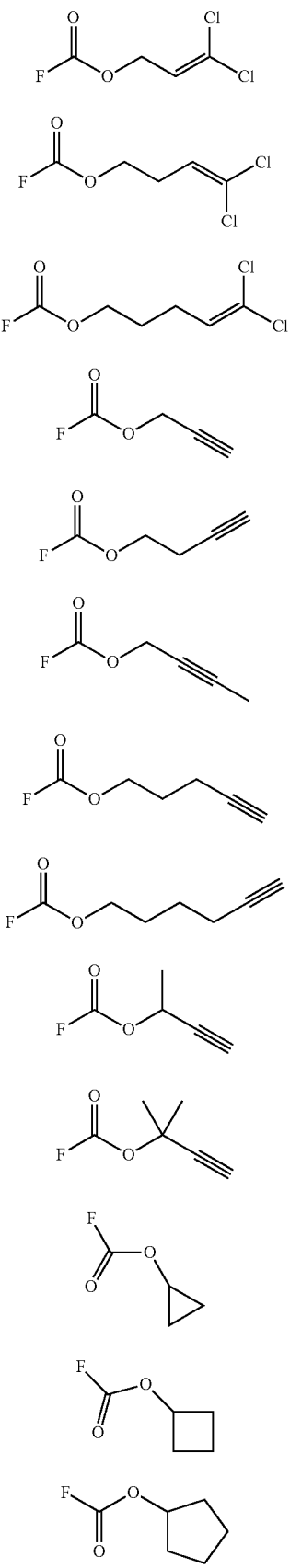
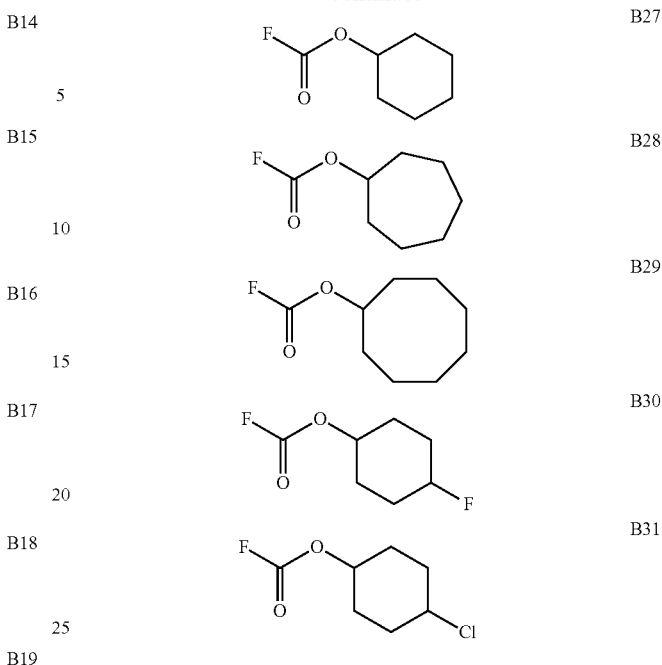

According to a preferred embodiment of the present invention, preferable among the compounds above are compounds having structures of A1 to A4, A9 to A32, B1 to B5, B9 to B12, B14, B15, B17 to B19, B22, or B24 to B29; more preferable are compounds having structures of A1 to A4, A9 to A19, B2 to B4, B9 to B12, B317 to B19, B22, or B25 to B28; and even more preferable is phenyl fluoroformate (structural formula A1), 3-t-butylphenyl fluoroformate (structural formula A9), 4-t-butylphenyl fluoroformate (structural formula A10), 4-chlorophenyl fluoroformate (structural formula A13), 4-fluorophenyl fluoroformate (structural formula A16), 2-trifluoromethylphenyl fluoroformate (structural formula A17), 4-trifluoromethylphenyl fluoroformate (structural formula A19), 3-butenyl fluoroformate (structural formula B2), 4-pentenyl fluoroformate (structural formula B4), 2-propynyl fluoroformate (structural formula B17), cyclopentyl fluoroformate (structural formula B26), or cyclohexyl fluoroformate (structural formula B27).

When n is 2, examples of L include: straight alkylene groups such as an ethylene group, a propane-1,3-diyl group, a butane-1,4-diyl group, a pentane-1,5-diyl group, a hexane-1,6-diyl group, a heptane-1,7-diyl group, an octane-1,8-diyl group, or the like; branched alkylene groups such as a propane-1,2-diyl group or the like; alkenylene groups such as a 2-butene-1,4-diyl group, a 2-pentene-1,5-diyl group, a 3-hexene-1,6-diyl group, a 3-hexene-2,5-diyl group; a 2,5-dimethyl-3-hexene-2,5-diyl group, or the like; alkynylene groups such as a 2-butyne-1,4-diyl group, 2-pentyne-1,5-diyl group, a 3-hexyne-1,6-diyl group, a 3-hexyne-2,5-diyl group, a 2,5-dimethyl-3-hexyne-2,5-diyl group, or the like; divalent connecting groups having ether bond(s) such as —CH$_2$CH$_2$OCH$_2$CH$_2$—, CH$_2$CH$_2$OCH$_2$CH$_2$OCH$_2$CH$_2$—, —CH(CH$_3$)CH$_2$OCH$_2$CH(CH$_3$)—, or the like; cycloalkylene groups such as a cyclopentane-1,2-diyl group, a cyclopentane-1,3-diyl group, a cyclohexane-1,2-diyl group, a cyclohexane-1,3-diyl group, a cyclohexane-1,4-diyl group, or the like; or arylene groups such as benzene-1,3-diyl group; a benzene-1,4-diyl group; a naphthalene-1,3-diyl group, a naphthalene-1,4-diyl group, or the like. Among these, preferable is an ethylene group, a propane-1,3-diyl group, a butane-1,4-diyl group, a pentane-1,5-diyl group, a hexane-1,6-diyl group, a propane-1,2-diyl group, a 2-butene-1,4-diyl group, a 2-pentene-1,5-diyl group, a 3-butene-1,4-diyl group, a 3-hexene-2,5-diyl group, a 2-butyne-1,4-diyl group, 2-pentyne-1,5-diyl group, a 3-hexyne-1,6-diyl group; a 3-hexyne-2,5-diyl group, —CH₂CH₂OCH₂CH₂—, —CH(CH₃)CH₂OCH₂CH(CH₃)—, a cyclopentane-1,3-diyl group, a cyclohexane-1,3-diyl group, a cyclohexane-1,4-diyl group, benzene-1,3-diyl group, or a benzene-1,4-diyl group: and more preferable is 2-butene-1,4-diyl group, 2-butyne-1,4-diyl group, benzene-1,4-diyl group, or the like.

When n is 2 in general formula (I), preferred compounds are as follows:

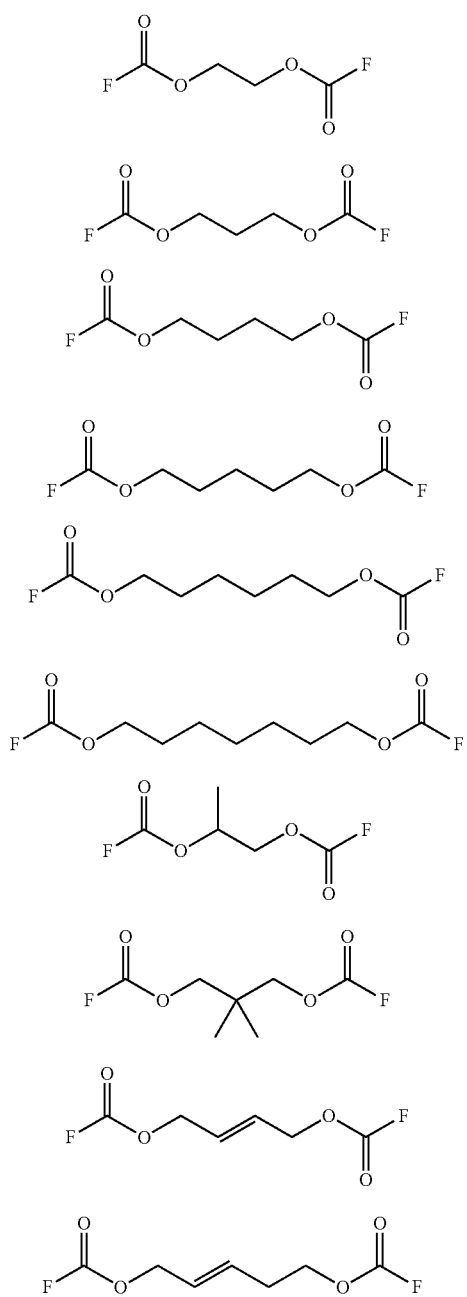

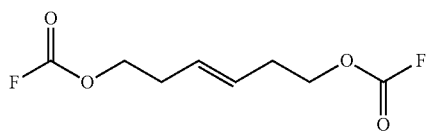

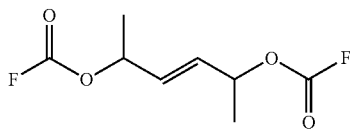

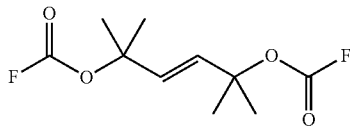

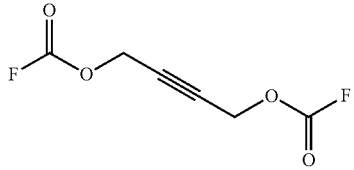

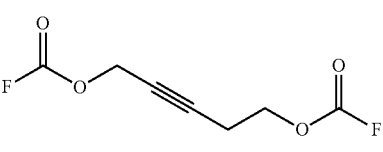

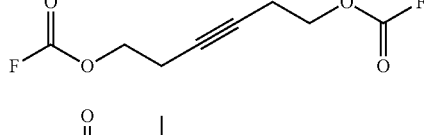

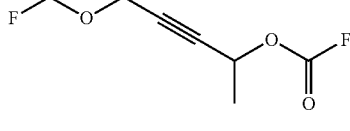

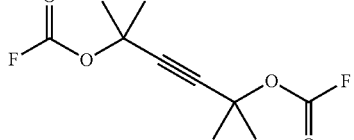

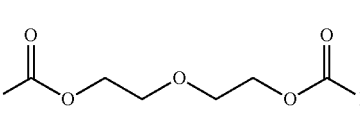

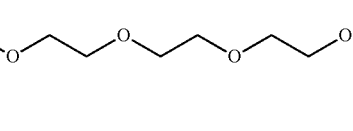

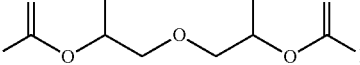

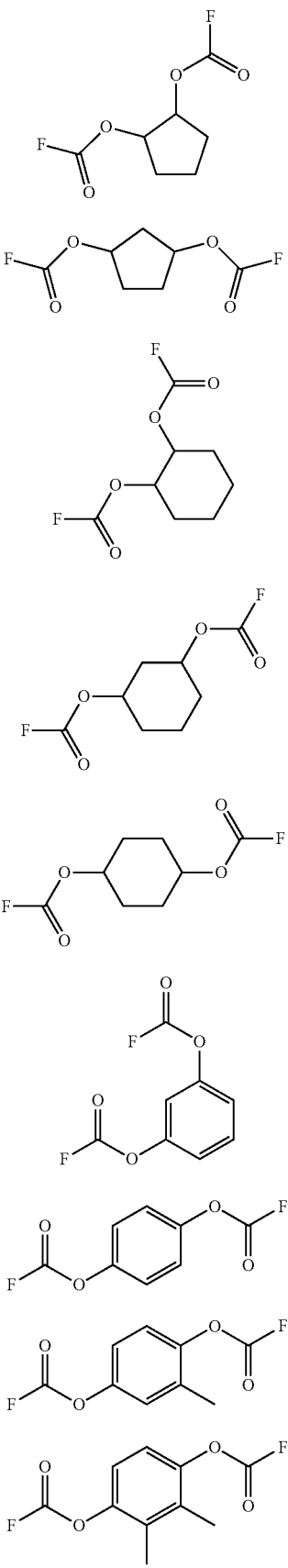

According to a preferred embodiment of the present invention, preferable among the compounds above are compounds having structures of C1 to C5, C7 to C12, C14 to C17, C19, C21, C23, C25, C26, D1 to D3, D5, or D6; more preferable are compounds having structures of C1 to C5, C7 to C9, C14, C17, C19, C25, C26, D1, or D2; and even more preferable is propane-1,3-diyl bis(fluoroformate) (structural formula C2), butane-1,4-diyl bis(fluoroformate) (structural formula C3), 2-butene-1,4-diyl bis(fluoroformate) (structural formula C9), 2-butyne-1,4-diyl bis(fluoroformate) (structural formula C14), oxybis(ethane-2,1-ethanediyl)bis (fluoroformate) (structural formula C19), cyclohexane-1,4-diyl bis(fluoroformate) (structural formula C26), or benzene-1,4-diyl bis(fluoroformate) (structural formula D2).

In the non-aqueous electrolytic solution of the present invention, the content of the compound represented by general formula (I) can be properly determined by taking into consideration the effect of addition, but is preferably in a range of 0.001 to 10% by mass in the non-aqueous electrolytic solution. When the content is not more than 10% by mass, there is no significant possibility that the film is formed excessively on the electrode and enables cycle characteristics to be maintained well when a battery is used at high temperature and high voltage. When the content is not less than 0.001% by mass, satisfactory film formation is realized and the effect of improving cycle characteristics is enhanced when the battery is used at high temperature and high voltage. According to a preferred embodiment of the present invention, the lower limit of the content of the compound represented by general formula (I) is preferably 0.05% by mass in the non-aqueous electrolytic solution, and more preferably 0.3% by mass. Further, the upper limit of the content is preferably 8% by mass, more preferably 5% by mass, and particularly preferably 3% by mass.

[Non-Aqueous Solvent]

One or more selected from cyclic carbonates, chain esters, lactones, ethers, and amides may be mentioned as the non-aqueous solvent used in the non-aqueous electrolytic solution of the present invention, where a mixed solvent of two or more is more suitable. According to a preferred embodiment of the present invention, a solvent containing chain esters is preferable because it can synergistically improve electrochemical characteristics of the battery under high temperature, more preferably the solvent contains chain carbonates, and most preferably the solvent contains both cyclic carbonates and chain carbonates.

Meanwhile, in the present description, the term "chain ester" is used to include chain carbonates and chain carboxylic acid esters.

Examples of suitable cyclic carbonates include one or at least two selected from ethylene carbonate (EC), propylene carbonate (PC), 1,2-butylene carbonate, 2,3-butylene carbonate, 4-fluoro-1,3-dioxolan-2-one (FEC), trans- or cis-4,5-difluoro-1,3-dioxolan-2-one (hereinafter, the two are collectively referred to as "DFEC"), vinylene carbonate (VC), vinylethylene carbonate (VEC), and 4-ethynyl-1,3-dioxolan-2-one (EEC). Among these, suitable are one or more, and more suitable are two or more selected from ethylene carbonate, propylene carbonate, 4-fluoro-1,3-dioxolan-2-one, vinylene carbonate, and 4-ethylnyl-1,3-dioxolan-2-one.

Further, according to one embodiment of the present invention, it is preferable to use, as a non-aqueous solvent, at least one of cyclic carbonates having an unsaturated bond such as a carbon-carbon double bond, a carbon-carbon triple bond, or the like, or fluorine atom(s) because, thereby, electrochemical characteristics of the battery under high temperature are further improved. It is more preferable that the non-aqueous solvent contains both a cyclic carbonate containing an unsaturated bond such as a carbon-carbon double bond, a carbon-carbon triple bond, or the like, and a cyclic carbonate having fluorine atom(s). As a cyclic carbonate having an unsaturated bond such as a carbon-carbon double bond, a carbon-carbon triple bond, or the like, more preferable is VC, VEC, or EEC. As a cyclic carbonate having fluorine atom(s), more preferable is FEC or DFEC.

The content of the cyclic carbonate having an unsaturated bond such as a carbon-carbon double bond, a carbon-carbon triple bond, or the like may be properly determined, but is, based on the total volume of the non-aqueous solvent, preferably not less than 0.07% by volume, more preferably not less than 0.2% by volume, and still more preferably not less than 0.7% by volume. The upper limit of the content is preferably 7% by volume, more preferably 4% by volume, and still more preferably 2.5% by volume. By setting the content to the above range, a marked increase in stability of the film can be realized advantageously without sacrificing Li (lithium) ion permeability at high temperatures.

The content of the cyclic carbonate having a fluorine atom is preferably not less than 0.07% by volume, more preferably not less than 4% by volume, still more preferably not less than 7% by volume, based on the total volume of the non-aqueous solvent. The upper limit of the content of the cyclic carbonate is preferably 35% by volume, more preferably 25% by volume, still more preferably 15% by volume, based on the total volume of the non-aqueous solvent. When the content of the cyclic carbonate is in the above-defined range, a marked increase in stability of the film can be realized advantageously without sacrificing Li (lithium) ion permeability at high temperatures. Further, when the content is not more than 15% by volume, stability of the film under high temperature can be further increased without impairing Li ion permeability, which is preferable.

When the non-aqueous solvent contains both of a cyclic carbonate having an unsaturated bond such as a carbon-carbon double bond, a carbon-carbon triple bond, or the like, and a cyclic carbonate having fluorine atom(s), the content of the cyclic carbonate having an unsaturated bond such as a carbon-carbon double bond, a carbon-carbon triple bond, or the like based on the content of the cyclic carbonate having fluorine atom(s) may be properly determined, but is preferably not less than 0.2% by volume, more preferably not less than 3% by volume, and still more preferably not less than 7% by volume. The upper limit of the content is preferably not more than 40% by volume, more preferably not more than 30% by volume, and still more preferably not more than 15% by volume. By setting the contents to the above range, a marked increase in stability of the film can be realized particularly advantageously without sacrificing Li (lithium) ion permeability at high temperatures.

Further, according to other embodiment of the present invention, when the non-aqueous solvent contains both of ethylene carbonate and a cyclic carbonate having an unsaturated bond such as a carbon-carbon double bond, a carbon-carbon triple bond, or the like, stability of the film under high temperature is increased, which is preferable, the film being formed on the electrode. Contents of the ethylene carbonate and the cyclic carbonate having an unsaturated bond such as a carbon-carbon double bond, a carbon-carbon triple bond, or the like may be properly determined, but is, based on the total volume of the non-aqueous solvent, preferably not less than 3% by volume, more preferably not less than 5% by volume, and still more preferably not less than 7% by volume. The upper limit of the content is preferably 45% by volume, more preferably 35% by volume, and still more preferably 25% by volume.

One type of or a combination of two or more of these solvents may be used. It is preferable to combine two or more of them because, in that case, electrochemical characteristics under high temperature is further improved, and it is particularly preferable to use three or more of them in combination. A preferable combination of these cyclic carbonates includes: EC and PC; EC and VC; PC and VC; VC and FEC; EC and FEC; PC and FEC; FEC and DFEC; EC and DFEC; PC and DFEC; VC and DFEC; VEC and DFEC; VC and EEC; EC and EEC; EC, PC, and VC; EC, PC, and FEC; EC, VC, and FEC; EC, VC, and VEC; EC, VC, and EEC; EC, EEC, and FEC; PC, VC, and FEC; EC, VC, and DFEC; PC, VC, and DFEC; EC, PC, VC, and FEC; EC, PC, VC, and DFEC; or the like. Among the above combinations, a more preferable combination is EC and VC; EC and FEC; PC and FEC; EC, PC, and VC; EC, PC, and FEC; EC, VC, and FEC; EC, VC, and EEC; EC, EEC, and FEC; PC, VC, and FEC; EC, PC, VC, and FEC; or the like, and even more preferable is, because battery characteristics under high voltage are improved, a combination which includes PC, such as: PC and FEC; EC, PC, and VC: EC, PC, and FEC; PC, VC, and FEC; EC, PC, VC, and FEC; or the like.

Examples of suitable chain esters include: one or at least two of asymmetric chain carbonates selected from methyl ethyl carbonate (MEC), methyl propyl carbonate (MPC), methyl isopropyl carbonate (MIPC), methyl butyl carbonate, and ethyl propyl carbonate; one or at least two of symmetric chain carbonates selected from dimethyl carbonate (DMC), diethyl carbonate (DEC), dipropyl carbonate, and dibutyl carbonate; one or at least two of chain carboxylic acid esters selected from methyl pivalate (MPiv), ethyl pivalate (EPiv), propyl pivalate (PPiv), methyl propionate (MP), ethyl propionate (EP), methyl acetate (MA), and ethyl acetate (EA); one or at least two of asymmetric fluorinated chain carbonates selected from methyl 2,2,2-trifluoroethyl carbonate (MTFEC), ethyl 2,2,2-trifluoroethyl carbonate, fluoromethyl methyl carbonate (FMMC), methyl 2,2,3,3-tetrafluoropropyl carbonate (MTEFPC), ethyl 2,2,3,3-tetrafluoropropyl carbonate, 2-fluoroethyl methyl carbonate (2-FEMC), and difluoromethyl fluoromethyl carbonate: one or at least two of symmetric fluorinated chain carbonates selected from bis(2-fluoroethyl) carbonate, bis(2,2,3,3-tetrafluoropropyl) carbonate, bis(2,2,2-trifluoroethyl) carbonate, and bis(fluoromethyl) carbonate.

Among the chain esters, methyl-containing chain esters selected from dimethyl carbonate (DMC), methyl ethyl carbonate (MEC), methyl propyl carbonate (MPC), methyl isopropyl carbonate (MIPC), methyl butyl carbonate, methyl propionate (MP), methyl acetate (MA), and ethyl acetate (EA) are preferred, and methyl-containing chain carbonates are particularly preferred.

Further, according to other embodiment of the present invention, it is preferable, from a viewpoint of improving electrochemical characteristics of the battery under high voltage, to use a non-aqueous solvent containing at least one kind selected from symmetric fluorinated chain carbonates and asymmetric fluorinated chain carbonates. Above all, more preferable is an asymmetric fluorinated chain carbonate having a methyl group selected from methyl 2,2,2-trifluoroethyl carbonate (MTFEC), 2-fluoroethyl methyl carbonate (2-FEMC), and methyl 2,2,3,3-tetrafluoropropyl carbonate (MTEFPC).

When chain carbonates are used, the use of two or more is preferred. Further, more preferred is a non-aqueous solvent containing both of a symmetric chain carbonate and an asymmetric chain carbonate. Still more preferable is a non-aqueous solvent wherein a content of the symmetric chain carbonate is larger than the content of the asymmetric chain carbonate.

A content of the linear ester is not particularly limited but is preferably used in a range of 60 to 90% by volume based on the total volume of the non-aqueous solvent. When the content is 60% by volume or more, viscosity of the non-aqueous electrolytic solution does not become too high and, when the content is 90% by volume or less, there is little fear that electric conductivity of the non-aqueous electrolytic solution decreases and electrochemical characteristics of the battery under high temperature deteriorate. Therefore, the content of the linear ester is preferably in the range above.

According to one embodiment of the present invention, preferably, not less than 51% by volume, more preferably not less than 55% by volume, of the volume of the chain carbonate is accounted for by the symmetric chain carbonate. The upper limit of the content of the symmetric chain carbonate is preferably 95% by volume, more preferably 85% by volume. The presence of dimethyl carbonate in the symmetric chain carbonate is particularly preferred. Further, more preferably, the asymmetric chain carbonate contains methyl, and methyl ethyl carbonate is particularly preferred. The above cases are preferable because electrochemical characteristics of the battery under high temperature are further improved.

According to one embodiment of the present invention, the ratio between the cyclic carbonate and the cyclic ester is preferably cyclic carbonate: chain ester (volume ratio)=10: 90 to 45:55, more preferably 15:85 to 40:60, particularly preferably 20:80 to 35:65 from the point of view of improvement of electrochemical characteristics of the battery under high temperature.

Other non-aqueous solvents include suitably one or more, more suitably two or more selected from: cyclic ethers such as tetrahydrofuran, 2-methyltetrahydrofuran, 1,4-dioxane, and the like; linear ethers such as 1,2-dimethoxyethane, 1,2-diethoxyethane, 1,2-dibutoxyethane, and the like; amides such as dimethylformamide and the like; sulfones such as sulfolane and the like; and lactones such as γ-butyrolactone, γ-valerolactone, α-angelicalactone, and the like.

The non-aqueous solvents are generally used as a mixture from the viewpoint of realizing proper properties. Suitable combinations of the non-aqueous solvents include, for example, a combination of a cyclic carbonate and a chain carbonate, a combination of a cyclic carbonate and a chain carboxylic ester, a combination of a cyclic carbonate, a chain carbonate and a lactone, a combination of a cyclic carbonate, a chain carbonate, and an ether, or a combination of a cyclic carbonate, a chain carbonate, and a chain carboxylic ester.

According to a preferred embodiment of the present invention, other additives are further added to the non-aqueous electrolytic solution in order to further improve stability of the film under high temperature. Specific examples of the other additives include the following compounds of (A) to (I).

(A) One or at least two of nitriles selected from acetonitrile, propionitrile, succinonitrile, glutaronitrile, adiponitrile, pimelonitrile, sbelonirile, and sebaconitrile.

(B) Aromatic compounds including: aromatic compounds having a branched alkyl group such as cyclohexylbenzene, fluorocyclohexylbenzene compounds (1-fluoro-2-cyclohexylbenzene, 1-fluoro-3-cyclohexylbenzene, and 1-fluoro-4-cyclohexylbenzene), tert-butylbenzene, tert-amylbenzene, 1-fluoro-4-tert-butylbenzene, and the like; biphenyl, terphenyl (o-, m-, or p-form), diphenyl ether, fluorobenzene, difluorobenzene (o-, m-, or p-form), anisole, 2,4-difluoroanisole, partially hydrogenated products of terphenyl (1,2-dicyclohexylbenzene, 2-phenyl bicyclohexyl, 1,2-diphenyl cyclohexane, and o-cyclohexylbiphenyl), and the like.

(C) One or at least two of isocyanate compounds selected from methyl isocyanate, ethyl isocyanate, butyl isocyanate, phenyl isocyanate, tetramethylene diisocyanate, hexamethylene diisocyanate, octamethylene diisocyanate, 1,4-phenylene disocyanate, 2-isocyanatoethyl acrylate, and 2-isocyanatoethyl methacrylate.

(D) One or at least two of triple bond-containing compounds selected from 2-propynyl methyl carbonate, 2-propynyl acetate, 2-propynyl formate, 2-propynyl methacrylate, 2-propynyl methanesulfonate, 2-propynyl vinylsulfonate, 2-propynyl 2-(methanesulfonyloxy)propionate, di(2-propynyl) oxalate, methyl 2-propynyl oxalate, ethyl 2-propynyl oxalate, di(2-propynyl) glutarate, 2-butyne-1,4-diyl dimethanesulfonate, 2-butyne-1,4-diyl diformate, and 2,4-hexadiyne-1,6-diyl dimethanesulfonate.

(E) One or at least two of S=O group-containing compounds selected from: sultones such as 1,3-propanesultone, 1,3-butanesultone, 2,4-butanesultone, 1,4-butanesultone, 1,3-propenesultone, 2,2-dioxide-1,2-oxathiolan-4-yl acetate, 5,5-dimethyl-1,2-oxathiolan-4-one 2,2-dioxide, or the like; cyclic sulfites such as ethylene sulfite, hexahydrobenzo[1,3,2]dioxathiolane-2-oxide (also referred to as 1,2-cyclohexanediol cyclic sulfite), 5-vinyl-hexahydro-1,3,2-benzodioxathiol-2-oxide, or the like; sulfonic acid esters such as butane-2,3-diyl dimethanesulfonate, butane-1,4-diyl dimethanesulfonate, methylene methanedisulfonate, or the like; and vinyl sulfone compounds such as divinyl sulfone, 1,2-bis(vinylsulfonyl)ethane, bis(2-vinylsulfonylethyl) ether, or the like.

(F) Cyclic acetal compounds such as 1,3-dioxolane, 1,3-dioxane, 1,3,5-trioxane, and the like.

(G) One or at least two of phosphorous-containing compounds selected from trimethyl phosphate, tributyl phosphate, trioctyl phosphate, tris(2,2,2-trifluoroethyl)phosphate, bis(2,2,2-trifluoroethyl)methyl phosphate, bis(2,2,2-trifluoroethyl)ethyl phosphate, bis(2,2,2-trifluoroethyl) 2,2-difluoroethyl phosphate, bis(2,2,2-trifluoroethyl) 2,2,3,3-tetrafluoropropyl phosphate, bis(2,2-difluoroethyl) 2,2,2- trifluoroethyl phosphate, bis(2,2,3,3-tetrafluoropropyl) 2,2,2-trifluoroethyl phosphate, 2,2,2-trifluoroethyl 2,2,3,3-tetrafluoropropyl methyl phosphate, tris(1,1,1,3,3,3-hexafluoropropan-2-yl)phosphate, methylene bis(methyl phosphonate), methylene bis(ethyl phosphonate), ethylene bis(methyl phosphonate), ethylene bis(ethyl phosphonate), butylene bis(methyl phosphonate), butylene bis(ethyl phosphonate), methyl 2-(dimethylphosphoryl)acetate, ethyl 2-(dimethylphosphoryl)acetate, methyl 2-(diethylphosphoryl)acetate, ethyl 2-(diethylphosphoryl)acetate, 2-propynyl 2-(dimethylphosphoryl)acetate, 2-propynyl 2-(diethylphosphoryl)acetate, methyl 2-(dimethoxyphosphoryl)acetate, ethyl 2-(dimethoxyphosphoryl)acetate, methyl 2-(diethoxyphosphoryl)acetate, ethyl 2-(diethoxyphosphoryl)acetate, 2-propynyl 2-(dimethoxyphosphoryl)acetate, 2-poppynyl 2-(diethoxyphosphoryl)acetate, methyl pyrophosphate, and ethyl pyrophosphate.

(H) Linear carboxylic acid anhydrides such as acetic anhydride, propionic anhydride, or the like; and cyclic acid anhydrides such as succinic anhydride, maleic anhydride, 3-allylsuccinic anhydride, glutaric anhydride, itaconic anhydride, 3-sulfopropionic anhydride, or the like.

(I) Cyclic phosphazene compounds such as methoxypentafluorocyclotriphosphazene, ethoxypentafluorocyclotriphosphazene, phenoxypenta luorocyclotriphosphazene, ethoxyheptafluorocyclotetraphosphazene, or the like.

Among the above compounds, the electrolytic solution preferably contains at least one or more kinds selected from the (A) nitriles, the (B) aromatic compounds, and the (C) isocyanate compounds, because thereby electrochemical characteristics of the battery are further improved in a wider range of temperature.

Among the (A) nitriles, more preferable are one or at least two selected from succinonitrile, glutaronitrile, adiponitrile, and pimelonitrile.

Among the (B) aromatic compounds, more preferable are one or at least two selected from biphenyl, terphenyl (o-, m-, or p-form), fluorobenzene, cyclohexylbenzene, tert-butylbenzene, and tert-amylbenzene, and particularly preferable are one or at least two selected from biphenyl, o-terphenyl, fluorobenzene, cyclohexylbenzene, and tert-amylbenzene.

Among the (C) isocyanate compounds, more preferable are one or at least two selected from hexamethylene diisocyanate, octamethylene diisocyanate, 2-isocyanatoethyl acrylate, and 2-isocyanatoethyl methacrylate.

A content of the compounds of (A) to (C) is preferably 0.01 to 7% by mass in the non-aqueous electrolytic solution. When the content is in this range, the film is formed sufficiently without becoming too thick and stability of the film under high temperature is further enhanced. The content is more preferably not less than 0.05% by mass in the non-aqueous electrolytic solution, and still more preferably not less than 0.1% by mass. The upper limit of the content is more preferably 5% by mass, and still more preferably 3% by mass.

Furthermore, when the non-aqueous electrolytic solution contains the (D) triple bond-containing compounds, the (E) cyclic or linear S(=O) group-containing compounds selected from sultones, cyclic sulfites, sulfonic acid esters, and vinyl sulfones, the (F) cyclic acetal compounds, the (G) the phosphorous-containing compounds, the (H) cyclic acid anhydrides, the (I) cyclic phosphazene compounds, stability of the film under high temperature is further improved advantageously.

As the (D) triple bond-containing compounds, preferable are one or at least two selected from 2-propynyl methyl carbonate, 2-propynyl methacrylate, 2-propynyl methanesulfonate, 2-propynyl vinylsulfonate, 2-propynyl 2-(methanesulfonyloxy)propionate, di(2-propynyl) oxalate, methyl 2-propynyl oxalate, ethyl 2-propynyl oxalate, and 2-butyne-1,4-diyl dimethanesulfonate; and even more preferable are one or at least two selected from 2-propynyl methanesulfonate, 2-propynyl vinylsulfonate, 2-propynyl 2-(methanesulfonyloxy)propionate, di(2-propynyl) oxalate, and 2-butyne-1,4-diyl dimethanesulfonate.

It is preferable to use cyclic or linear S(=O) group-containing compounds (where, triple bond-containing compounds are not included) selected from the (E) sultones, cyclic sulfites, sulfonic acid esters, and vinyl sulfones.

The cyclic S(=O) group-containing compounds suitably include one or at least two selected from 1,3-propanesultone, 1,3-butanesultone, 1,4-butanesultone, 2,4-butanesultone, 1,3-propenesultone, 2,2-dioxide-1,2-oxathiolan-4-yl acetate, 5,5-dimethyl-1,2-oxathiolan-4-one 2,2-dioxide, methylene methanedisulfonate, ethylene sulfite, and 4-(methylsulfonylmethyl)-1,3,2-dioxathiolane 2-oxide.

Further, the linear S(=O) group-containing compounds suitably include one or at least two selected from butane-2,3-diyl dimethanesulfonate, butane-1,4-diyl dimethanesulfonate, dimethyl methanedisulfonate, pentafluorophenyl methanesulfonate, divinyl sulfone, and bis(2-vinylsulfonylethyl) ether.

Among the cyclic or linear S(=O) group-containing compounds, more preferable are one or at least two selected from 1,3-propanesultone, 1,4-butanesultone, 2,4-butanesultone, 2,2-dioxide-1,2-oxathiolan-4-yl acetate, 5,5-dimethyl-1,2-oxathiolan-4-one 2,2-dioxide, butane-2,3-diyl dimethanesulfonate, pentafluorophenyl methanesulfonate, and divinyl sulfone.

As the (F) cyclic acetal compounds, preferable is 1,3-dioxolane or 1,3-dioxane, and more preferable is 1,3-dioxane.

As the (G) phosphorous-containing compounds, preferable is tris(2,2,2-trifluoroethyl)phosphate, tris(1,1,1,3,3,3-hexafluoropropan-2-yl)phosphate, methyl 2-(dimethylphosphoryl)acetate, ethyl 2-(dimethylphosphoryl)acetate, methyl 2-(diethylphosphoryl)acetate, ethyl 2-(diethylphosphoryl)acetate, 2-propynyl 2-(dimethylphosphoryl)acetate, 2-propynyl 2-(diethylphosphoryl)acetate, methyl 2-(dimethoxyphosphoryl)acetate, ethyl 2-(dimethoxyphosphoryl)acetate, methyl 2-(diethoxyphosphoryl)acetate, ethyl 2-(diethoxyphosphoryl)acetate, 2-propynyl 2-(dimethoxyphosphoryl)acetate, or 2-propynyl 2-(diethoxyphosphoryl)acetate; and more preferable is tris(2,2,2-trifluoromethyl)phosphate, tris(1,1,1,3,3,3-hexafluoropropan-2-yl)phosphate, ethyl 2-(diethylphosphoryl)acetate, 2-propynyl 2-(dimethylphosphoryl)acetate, 2-propynyl 2-(diethylphosphoryl)acetate, ethyl 2-(diethoxyphosphoryl)acetate, 2-propynyl 2-(dimethoxyphosphoryl)acetate, or 2-propynyl 2-(diethoxyphosphoryl) acetate.

As the (H) cyclic acid anhydrides, preferable is succinic anhydride, maleic anhydride, or 3-allylsuccinic anhydride; and more preferable is succinic anhydride or 3-allylsuccinic anhydride.

As the (I) cyclic phosphazene compounds, preferable is a cyclic phosphazene compound such as methoxypentafluorocyclotriphosphazene, ethoxypentafluorocyclotriphosphazene, phenoxypenta fluoro-cyclotriphosphazene, or the like; and more preferable is methoxypentafluoro-cyclotriphosphazene or ethoxypentafluorocyclotriphosphazene.

A content of the compounds of (D) to (I) is preferably 0.001 to 5% by mass in the non-aqueous electrolytic solution. When the content is in this range, the film is formed sufficiently without becoming too thick and stability of the film under high temperature is further enhanced. The content is more preferably not less than 0.01% by mass, and still more preferably not less than 0.1% by mass in the non-aqueous electrolytic solution. The upper limit of the content is more preferably 3% by mass, and still more preferably 2% by mass.

Furthermore, according to another embodiment of the present invention, the non-aqueous electrolytic solution, for a purpose of further improving stability of the film under high temperature; preferably contains one or more kinds of lithium salts selected from lithium salts having an oxalic acid skeleton, lithium salts having a phosphoric acid skeleton, and lithium salts having a $S(=O)$ group.

Specific examples of the lithium salts suitably include: at least one kind of lithium salt having an oxalic acid skeleton selected from lithium bis(oxalato)borate (LiBOB), lithium difluoro(oxalato)borate (LiDFOB), lithium tetrafluoro(oxalato)phosphate (LiTFOP), and lithium difluorobis(oxalato)phosphate (LiDFOP); lithium salts having a phosphoric acid skeleton such as $LiPO_2F_2$ and $Li_2PO_3F$, and the like; one or more kinds of lithium salts having a $S=(O)$ group selected from lithium trifluoro((methanesulfonyl)oxy)borate (LiTFMSB), lithium pentafluoro((methanesulfonyl)oxy)phosphate (LiPFMSP), lithium methyl sulfate (LMS), lithium ethyl sulfate (LES), lithium 2,2,2-trifluoroethyl sulfate (LFES), and $FSO_3Li$. More preferably; the non-aqueous electrolytic solution contains lithium salt(s) selected from LiBOB, LiDFOB, LiTFOP, LiDFOP, $LiPO_2F_2$, LiTFMSB, LMS, LES, LFES, and $FSO_3Li$.

A total content of one or more kinds of lithium salts selected from LiBOB, LiDFOB, LiTFOP, LiDFOP, $LiPO_2F_2$, $Li_2PO_3F$, LiTFMSB, LiPFMSP, LMS, LES, LFES, and $FSO_3Li$ is preferably 0.001 to 10% by mass in the non-aqueous electrolytic solution. When the content is not more than 10% by mass, there is no fear that the film is formed excessively on the electrode to cause deterioration of storage characteristics, and when the content is not less than 0.001% by mass; the film formation is sufficient to increase an improvement effect of characteristics when the battery is used under high temperature and high pressure. The content is, in the non-aqueous electrolytic solution, preferably not less than 0.05% by mass, more preferably not less than 0.1% by mass, and still more preferably not less than 0.3% by mass, and the upper limit of the content is preferably 5% by mass, more preferably 3% by mass, and still more preferably 2% by mass.

[Electrolyte Salt]

Lithium salts may be mentioned as the suitable electrolyte salt usable in the present invention. Suitable lithium salts include: inorganic lithium salts such as $LiPF_6$, $LiBF_4$, $LiClO_4$, and the like; $LiN(SO_2F)_2$ [referred to as "FSI" in short]; lithium salts containing a linear fluorinated alkyl group such as $LiN(SO_2CF_3)_2$ [referred to as TFSI in short], $LiN(SO_2C_2F_5)_2$, $LiCF_3SO_3$, $LiC(SO_2CF_3)_3$, $LiPF_4$ $(CF_3)_2$, $LiPF_3$ $(C_2F_5)_3$, $LiPF_3$ $(CF_3)_3$, $LiPF_3$ $(iso-C_3F_7)_3$, $LiPF_5$ $(iso-C_3F_7)$, and the like; and lithium salts having a cyclic fluorinated alkylene chain such as $(CF_2)_2(SO_2)_2NLi$, $(CF_2)_3(SO_2)_2NLi$, and the like. At least one lithium salt selected from these may suitably be mentioned, and one type or a mixture of two or more of these may be used.

Among these, preferable are one or at least two selected from $LiPF_6$, $LiBF_4$, $LiN(SO_2CF_3)_2$ [TFSI], $LiN(SO_2C_2F_5)_2$, and $LiN(SO_2F)_2$ [FSI], and most preferable is to use LiPF6. A concentration of the lithium salt is, based on the non-aqueous solvent, usually preferably 0.3 M or more, more preferably 0.7 M or more, and still more preferably 1.1 M or more. Further, an upper limit thereof is preferably 2.5 M or less, more preferably 2.0 M or less, and still more preferably 1.6 M or less.

In addition, a preferred combination of these lithium salts includes $LiPF_6$ and further at least one lithium salt selected from $LiBF_4$, $LiN(SO_2CF_3)_2$ [TFSI], and $LiN(SO_2F)_2$[FSI] that are contained in a non-aqueous electrolytic solution. When the content of lithium salts other than $LiPF_6$ in the non-aqueous solvent is not less than 0.001 M, the effect of improving electrochemical characteristics when the battery is used at high temperatures is likely to be attained. On the other hand, when the content is not more than 0.8 M, advantageously, the effect of improving electrochemical characteristics when the battery is used at high temperatures is less likely to be lowered. The content is preferably not less than 0.01 M, particularly preferably not less than 0.03 M, most preferably not less than 0.04 M. The upper limit of the content is preferably 0.6 M, more preferably 0.4, particularly preferably 0.2 M.

[Production of Non-Aqueous Electrolytic Solution]

The non-aqueous electrolytic solution of the present invention can be obtained, for example, by mixing the non-aqueous solvents and adding the electrolyte salt and the fluoroformate ester compound represented by general formula (I) to the mixture.

In this case, the non-aqueous solvents used herein and the compound to be added to the non-aqueous electrolytic solution are those that have a lowest attainable impurity content attained by previously purifying them to such an extent that does not significantly sacrifice the productivity.

[Power Storage Device]

The power storage device of the present invention can be obtained by installing, for example, a positive electrode, a negative electrode, and the non-aqueous electrolytic solution.

The non-aqueous electrolytic solution of the present invention can be used for the following first to fourth embodiments of power storage devices and, the non-aqueous electrolyte may be in a liquid form as well as in a gel form. Further, the non-aqueous electrolytic solution of the present invention can also be used for solid polymer electrolytes. Above all, the non-aqueous electrolytic solution of the present invention is preferably used for the first embodiment of power storage devices using lithium salts as the electrolyte salt, that is, for lithium batteries, or the fourth power storage devices, that is, for lithium ion capacitors, more preferably for lithium batteries, still more preferably for lithium ion rechargeable batteries.

First Embodiment of Power Storage Device: Lithium Battery

In the present description, the lithium battery, which is the first embodiment of power storage device, is a general term for lithium primary batteries and lithium ion rechargeable batteries. Further, the term "lithium ion rechargeable battery" as used herein is used as a concept including the so-called lithium ion rechargeable batteries. The lithium battery according to the present invention includes a positive electrode, a negative electrode, and the non-aqueous electrolytic solution containing an electrolyte salt dissolved in a non-aqueous solvent. Constituent members other than the non-aqueous electrolytic solution, that is, the positive electrode, negative electrode, and the like, may be used without particular limitation.

For example, as a positive electrode active material for lithium ion rechargeable battery, there are used lithium composite metal oxides containing at least one or at least two selected from cobalt, manganese, and nickel. One type or a combination of two or more of these positive electrode active materials may be used.

Such lithium composite metal oxides include one or at least two selected from, for example, $LiCoO_2$, $LiMn_2O_4$, $LiCo_{1-x}Ni_xO_2$ (0.01<x<1), $LiCo_{1/3}Ni_{1/3}Mn_{1/3}O_2$, $LiNi_{1/2}Mn_{3/2}O_4$; and $LiCo_{0.98}Mg_{0.02}O_2$. Further, a combination of $LiCoO_2$ with $LiMn_2O_4$, a combination of $LiCoO_2$ with $LiNiO_2$, and a combination of $LiMn_2O_4$ with $LiNiO_2$ may also be adopted.

A part of the lithium composite metal oxide may be replaced with other element(s) from the viewpoint of rendering the battery usable at a charge potential of not less than 4.3 V through an improvement in safety under overcharge conditions and cycle characteristics. Examples thereof include replacement of a part of cobalt, manganese, and nickel with one or more elements selected from Sn, Mg, Fe, Ti, Al, Zr, Cr, V, Ga, Zn, Cu, Bi, Mo, or La, replacement of a part of O with S or F, or covering with compounds containing these other elements.

Among them, lithium composite metal oxides are preferred such as $LiCoO_2$, $LiMn_2O_4$ and $LiNiO_2$ that allow the charge potential of the positive electrode in a full charge state to be not less than 4.3 V on a Li basis. More preferred are lithium composite metal oxides that are usable at not less than 4.4 V, such as $LiCo_{1-x}M_xO_2$ wherein M represents one or at least two elements selected from Sn, Mg, Fe, Ti, Al, Zr, Cr, V, Ga, Zn, and Cu; and 0.001≤x≤0.05, $LiCo_{1/3}Ni_{1/3}Mn_{1/3}O_2$, $LiNi_{1/2}Mn_{3/2}O_4$, and a solid solution of $Li_2MnO_3$ and $LiMO_2$ wherein M represents a transition metal such as Co, Ni, Mn, or Fe. The use of lithium composite metal oxides that are operated at a high charge voltage tends to deteriorate electrochemical characteristics particularly when used over a wide range of temperature due to a reaction with the electrolytic solution during charge. However, in the lithium ion rechargeable battery pertaining to the present invention, lowering in these electrochemical characteristics can be suppressed. Particularly in a case of a positive electrode containing Mn, resistance of a battery tends to increase due to elution of Mn ions from the positive electrode, and therefore electrochemical characteristics when the battery is used over a wide range of temperature tends to deteriorate. However, In the lithium ion rechargeable battery pertaining to the present invention, the lowering of the electrochemical characteristics can be advantageously suppressed.

Further, olivine form of lithium-containing phosphoric acid salts may also be used as the positive electrode active material. Olivine form of lithium-containing phosphoric acid salts containing one or at least two metals selected from iron, cobalt, nickel, and manganese are particularly preferred. Specific examples thereof include one or at least two selected from $LiFePO_4$, $LiCoPO_4$, $LiNiPO_4$, and $LiMnPO_4$. A part of these olivine form of lithium containing phosphoric acid salts may be replaced with other element(s). Examples thereof include replacement of a part of iron, cobalt, nickel, and manganese with one or at least two elements selected from Co, Mn, Ni, Mg, Al, B, Ti, V, Nb, Cu, Zn, Mo, Ca, Sr, W, Zr and the like, or covering with compounds containing these other elements or with carbon materials. Among them, $LiFePO_4$ or $LiMnPO_4$ is preferred. Further, olivine form of lithium-containing phosphoric acid salts may also be used as a mixture, for example, with the positive electrode active material.

A positive electrode for the lithium primary battery includes; oxides of one or at least two of metal elements or chalcogen compounds, such as CuO, $Cu_2O$, $Ag_2O$, $Ag_2CrO_4$, CuS, $CuSO_4$, $TiO_2$, $TiS_2$, $SiO_2$, SnO, $V_2O_5$, $V_6O_{12}$, $VO_x$, $Nb_2O_5$, $Bi_2O_3$, $Bi_2Pb_2O_5$, $Sb_2O_3$, $CrO_3$, $Cr_2O_3$, $MoO_3$, $WO_3$, $SeO_2$, $MnO_2$, $Mn_2O_3$, $Fe_2O_3$, FeO, $Fe_3O_4$, $Ni_2O_3$, NiO, $CoO_3$, CoO, or the like; sulfur compounds such as $SO_2$, $SOCl_2$, or the like; and carbon fluoride (graphite fluoride) represented by a general formula $(CF_x)_n$; and the like. Among these, preferable are $MnO_2$, $V_2O_5$ graphite fluoride, and the like.

As pH of a supernatant liquid when 10 g of the positive electrode active material is dispersed in 100 ml of distilled water, 10.0 to 12.5 is preferable because, in that case, there can be obtained an improvement effect of the electrochemical characteristics in a much wider temperature range, and more preferable is when the pH is 10.5 to 12.0.

Furthermore, when Ni is contained in the positive electrode as an element, impurities such as LiOH and the like in the positive electrode active material tend to increase and, therefore, an improvement effect of electrochemical characteristics in a much wider range of temperature is easy to be obtained, which is preferable. More preferable is when the Ni atom concentration in the positive electrode active material is 5 to 25 atomic %, and particularly preferable is when the Ni atom concentration is 8 to 21 atomic %.

Any electron-conductive material that does not cause a chemical change may be used as the conductive agent of the positive electrode without particular limitation. Examples of preferred conductive agents include one or at least two graphites such as natural graphites, for example, flaky graphites, and artificial graphites and carbon blacks such as acetylene black, ketjen black, channel black, furnace black, lamp black, and thermal black. The graphite and the carbon black may be properly mixed together before use. The amount of the conductive agent to the positive electrode mixture is preferably 1 to 10% by mass, particularly preferably 2 to 5% by mass.

The positive electrode can be prepared by mixing the positive electrode active material with a conductive material such as acetylene black or carbon black and a binder such as polytetrafluoroethylene (PTFE), polyvinylidene fluoride (PVDF), a copolymer of styrene with butadiene (SBR), a copolymer of acrylonitrile with butadiene (NBR), carboxymethylcellulose (CMC), or ethylene propylene diene terpolymer, adding a high-boiling solvent such as 1-methyl-2-pyrrolidone, kneading the mixture to prepare a positive electrode mixture, then coating the positive electrode mixture on an aluminum foil or a stainless steel lath plate for a current collector, drying the coating, pressing the coating, and then heating the pressed coating at a temperature of approximately 50° C. to 250° C. under vacuum for about 2 hr.

The density of the positive electrode excluding the current collector is generally not less than 1.5 g/cm3. The density is preferably not less than 2 g/cm3, more preferably not less than 3 g/cm3; still more preferably not less than 3.6 g/cm3, from the viewpoint of further enhancing the capacitance of the battery. Meanwhile, the upper limit of the density is preferably 4 g/cm3.

Lithium metal, lithium alloys, and carbon materials (for example, easily graphitizable carbon and hardly graphitizable carbon having a spacing of not less than 0.37 nm in (002) face, and a graphite having a spacing of not more than 0.34 nm in (002) face), tin (simple substance), tin compounds, silicon (simple substance), silicon compounds, or lithium titanate compounds such as $Li_4Ti_5O_{12}$ that can occlude and release lithium may be used either solely or in a combination of two or more of them as the negative electrode active material for lithium ion rechargeable batteries.

Among the negative electrode active materials, high-crystallinity carbon materials such as artificial graphites and natural graphites are more preferred from the viewpoint of the capability of occluding and releasing lithium ions, and carbon materials having a graphite-type crystal structure having a spacing (d002) of not more than 0.340 nm (nanometer), particularly 0.335 to 0.337 nm, in a lattice face (002) are still more preferred. In particular, it is preferable to use artificial graphite particles having a massive structure including a plurality of flat graphite fine particles that have been nonparallely aggregated or bonded to each other, or graphite particles treated by repeatedly applying mechanical action such as compressive force, frictional force, or shear force to flaky natural graphite particles for spheronization.

When the negative electrode excluding the current collector is pressed to a density of not less than 1.5 g/cm³, the ratio of the intensity of a peak of a (110) face, l(110), to the intensity of a peak of a (004) face, l(004), that is, l(110)/l(004), in a graphite crystal as obtained by X-ray diffractometry of the negative electrode sheet is preferably not less than 0.01 from the viewpoint of improvement of electrochemical characteristics in a much wider range of temperature, more preferably not less than 0.05, still more preferably not less than 0.1. Further, when the treatment is excessively carried out, the crystallinity is lowered, sometimes resulting in lowered discharge capacitance of the battery. Accordingly, the upper limit of the peak intensity ratio, l(110)/l(004), is preferably 0.5, more preferably 0.3.

Further, preferably, the highly crystalline carbon material (core material) is covered with a carbon material that has lower crystallinity than the core material because, in that case, the electrochemical characteristics can be further improved over a wide range of temperature. The crystallinity of the carbon material for covering can be confirmed under TEM.

When the highly crystalline carbon material is used, there is a tendency that the highly crystalline carbon material is reacted with the non-aqueous electrolytic solution during charge and, consequently, electrochemical characteristics at low temperatures or high temperatures are lowered due to increased interfacial resistance. However, in the lithium ion rechargeable batteries pertaining to the present invention, good electrochemical characteristics can be obtained over a wide range of temperature.

Metal compounds as the negative electrode active material that can occlude and release lithium suitably include compounds containing at least one metal element selected from Si, Ge, Sn, Pb, P, Sb, Bi, Al, Ga, In, Ti, Mn, Fe, Co, Ni, Cu, Zn, Ag, Mg, Sr, or Ba. These metal compounds may be in any form of simple substances, alloys, oxides, nitrides, sulfides, borides, alloys with lithium or the like. However, simple substances, alloys, oxides, or alloys with lithium are preferred from the viewpoint of increasing the capacitance. Among them, metal compounds containing at least one element selected from Si, Ge, and Sn are preferred, and metal compounds containing at least one element selected from Si and Sn are more preferred from the viewpoint of increasing the capacitance of the battery.

The negative electrode may be prepared by kneading a conductive agent, a binder, and a high boiling solvent that are the same as those used in the preparation of the positive electrode, to prepare a negative electrode mixture, coating the negative electrode mixture, for example, on a copper foil for the current collector, drying the coating, pressing the coating, and heating the pressed coating at a temperature of approximately 50° C. to 250° C. for about 2 hr under vacuum.

The density of the negative electrode excluding the current collector is generally not less than 1.1 g/cm³. The density is preferably not less than 1.5 g/cm³, more preferably not less than 1.7 g/cm³, from the viewpoint of further enhancing the capacity of the battery. Meanwhile, the upper limit of the density is preferably 2 g/cm³.

Lithium metal or lithium alloy may be mentioned as the negative electrode active material for lithium primary batteries.

In the present invention, a battery separator is not particularly limited, but there can be used a single-layer or laminated microporous film, a woven fabric, a nonwoven fabric, or the like which is made of a polyolefin such as polypropylene, polyethylene, an ethylene-propylene copolymer, or the like. As a polyolefin laminate, it is preferable to laminate polyethylene and polypropylene and, above all, more preferable is a three-layer structure of polypropylene/polyethylene/polypropylene.

The separator has a thickness of preferably not less than 2 µm, more preferably not less than 3 µm, and still more preferably not less than 4 µm. The upper limit of the thickness is 30 µm, preferably 20 µm, and more preferably 15 µm.

One surface or both surfaces of the separator are preferably provided with a heat-resistant layer comprising inorganic particles and/or organic particles and a binder. A thickness of the heat-resistant layer is preferably not less than 0.5 µm, more preferably not less than 1 µm, and still more preferably not less than 1.5 µm. The upper limit of the thickness is 7 µm, preferably 6 µm, and more preferably 5 µm.

The inorganic particles contained in the heat-resistant layer suitably include an oxide or a hydroxide containing an element selected from Al, Si, Ti, and Zr.

Specific examples of the inorganic particles include suitably one or more, more suitably two or more selected from: oxides such as silica ($SiO_2$), alumina ($Al_2O_3$), titanic ($TiO_2$), zirconia ($ZrO_2$), $BaTiO_3$, or the like; and hydroxides such as boehmite ($Al_2O_3 \cdot 3H_2O$) or the like. Above all, preferable are one or more selected from silica ($SiO_2$), alumina ($Al_2O_3$), zirconia ($ZrO_2$), $BaTiO_3$, and boehmite ($Al_2O_3 \cdot 3H_2O$); more preferable is silica ($SiO_2$), alumina ($Al_2O_3$), $BaTiO_3$, or boehmite ($Al_2O_3 \cdot 3H_2O$); and particularly preferable is alumina ($Al_2O_3$), $BaTiO_3$, or boehmite ($Al_2O_3 \cdot 3H_2O$).

The organic particles contained in the heat-resistant layer include suitably one or more, more suitably two or more selected from polymer particles of polyamide, aramid, polyimide, and the like. Above all, preferable are one or more selected from the group consisting of polyamide, aramid, and polyimide, and more preferable is polyimide or aramid.

The binder contained in the heat-resistant layer includes suitably one or more, more suitably two or more selected from the group consisting of an ethylene-vinyl acetate copolymer (EVA), an ethylene-acrylic acid copolymer such as ethylene-ethyl acrylate copolymer or the like, polytetrafluoroethylene (PTFE), polyvinylidene fluoride (PVDF), fluoro-rubber, styrene-butadiene rubber (SBR), carboxymethyl cellulose (CMC), hydroxyethyl cellulose (NEC), polyvinyl alcohol (PVA), polyvinyl butyral (PVB), polyvinylpyrrolidone (PVP), poly(N-vinyl acetamide), a crosslinked acrylic resin, polyurethane, and an epoxy resin. Above all, preferable are one or more selected from the group consisting of an ethylene-acrylic acid copolymer such as an ethylene-ethyl acrylate copolymer or the like, polyvinylpyrrolidone (PVP), poly(N-viny acetamide), polyvinylidene fluoride (PVDF), a copolymer of styrene and butadiene (SBR), and carboxymethyl cellulose (CMC).

The structure of the lithium battery is not particularly limited, and coin-type batteries, cylindrical batteries, angular batteries, or laminate-type batteries can be applied.

The lithium ion rechargeable battery in the present invention exhibits excellent electrochemical characteristics in a wide range of temperature even at a charge final voltage of not less than 4.2 V, particularly not less than 4.3 V, even at a charge final voltage of not less than 4.4 V. The discharge final voltage can be generally not less than 2.8 V, further even not less than 2.5 V. In the lithium ion rechargeable battery in the present invention, the discharge final voltage can be not less than 2.0 V. The current value is not particularly limited but is generally used in the range of 0.1 to 30 C. The lithium battery according to the present invention can be charged and discharged at −40 to 100° C., preferably −10 to 80° C.

In the present invention, the provision of a safe valve in the lid of the battery and the provision of a cut in members such as battery cans and gaskets can be adopted as a measure for preventing an increase in the internal pressure of the lithium battery. Further, a current cutoff mechanism that detects the internal pressure of the battery to cut off the current can be provided in the lid of the battery as a safety measure for overcharge prevention purposes.

Second Embodiment of Power Storage Device (Electric Double Layer Capacitor)

The second embodiment of power storage device of the present invention is a power storage device which comprises the non-aqueous electrolytic solution of the present invention and stores energy through the utilization of an electric double layer capacitance between an electrolytic solution and an electrode interface. An example of the capacitor according to the present invention is an electric double layer capacitor. The electrode active material that is most typically used in the power storage device is activated carbon. The double layer capacitance increases substantially proportionally with the surface area.

Third Embodiment of Power Storage Device

The third embodiment of power storage device of the present invention is a power storage device which comprises the non-aqueous electrolytic solution of the present invention and stores energy through the utilization of a doping/un-doping reaction in the electrode. Electrode active materials usable in the power storage device include metal oxides such as ruthenium oxide, iridium oxide, tungsten oxide, molybdenum oxide, and copper oxide and π-conjugated polymers such as polyacene and polythiophene derivatives. Capacitors using these electrode active materials can store energy through the utilization of a doping/un-doping reaction of the electrode.

Fourth Embodiment of Power Storage Device (Lithium Ion Capacitor)

The fourth embodiment of power storage device of the present invention is a power storage device which comprises the non-aqueous electrolytic solution of the present invention and stores energy through the utilization of intercalation of lithium ions in carbon materials such as graphite that is a negative electrode. This element is called a lithium ion capacitor (LIC). Positive electrodes include, for example, those that utilize an electric double layer between an activated carbon electrode and an electrolytic solution and those that utilize a doping/un-doping reaction of the π-conjugated polymer electrode. The electrolytic solution contains at least a lithium salt such as $LiPF_6$.

EXAMPLES

The present invention will be further described in detail with reference to the following examples, but the present invention is not limited to these examples.

Examples 1 to 18 and Comparative Examples 1 to 3

[Preparation of Lithium Ion Rechargeable Battery]

$LiNi_{1/3}Mn_{1/3}CO_{1/3}O_2$ (94% by mass) and acetylene black (conductive agent) (3% by mass) were mixed together, and the mixture was added to and mixed with a solution previously prepared by dissolving polyvinylidene fluoride (binder) (3% by mass) in 1-methyl-2-pyrrolidone to prepare a positive electrode mixture paste. The positive electrode mixture paste was coated on one surface of an aluminum foil (current collector). The coating was dried and pressed, followed by cutting into a predetermined size to prepare a strip-shaped positive electrode sheet. The density of the positive electrode excluding the current collector was 3.6 g/cm$^3$. Further, silicon (simple substance) (10% by mass), an artificial graphite ($d_{0.02}$=0.335 nm, negative electrode active material) (80% by mass), and acetylene black (conductive agent) (5% by mass) were mixed together, and the mixture was added to and mixed with a solution previously prepared by dissolving polyvinylidene fluoride (binder) (5% by mass) in 1-methyl-2-pyrrolidone to prepare a negative electrode mixture paste. The negative electrode mixture paste was coated on one surface of a copper foil (current collector), and the coating was dried and pressed, followed by cutting into a predetermined size to prepare a negative electrode sheet. The density of the negative electrode excluding the current collector was 1.5 g/cm$^3$. The electrode sheet was analyzed by X-ray diffractometry. As a result, the ratio of a peak intensity of (110) face, i.e. l(110), to a peak intensity of (004) face, i.e. l(004), of graphite crystal [l(110)/l(004)] was 0.1. The positive electrode sheet, a microporous polyethylene film separator, and the negative electrode sheet were stacked in that order. Further, a non-aqueous electrolytic solution having a composition described in Table 1 and Table 2 was added to prepare a laminate type battery.

[Evaluation of High-Temperature Cycle Characteristics]

The battery prepared by the above method was charged in a thermostatic chamber of 65° C. at a constant current of 1 C and a constant voltage for 3 hours to an end voltage of 4.3 V, and the battery was discharged under a constant current of 1 C to a discharge voltage of 3.0 V. This process was taken as one cycle, and the process was repeated for 100 cycles. Then, a capacity retention ratio after cycling was determined according to the following formula:

Capacity retention ratio(%)=(discharge capacity after the 100th cycle)/(discharge capacity after the 1$^{st}$ cycle)×100

The preparation conditions and battery characteristics were as shown in Tables 1 and 2.

TABLE 1

| | Composition of electrolyte salt Composition of non-aqueous electrolytic solution (volume ratio of solvents) | Compound (I) formula | Content in non-aqueous electrolytic solution % by mass) | Capacity retention ratio after high-temperature cycling (%) |
|---|---|---|---|---|
| Ex. 1 | 1M LiPF6 EC/PC/MEC/DEC (20/10/30/40) | 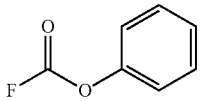 | 1 | 68 |
| Ex. 2 | 1M LiPF6 EC/MEC (30/70) | | 1 | 66 |
| Ex. 3 | 1M LiPF6 EC/PC/VC/MEC/DEC (20/9/1/30/40) | | 0.01 | 63 |
| Ex. 4 | 1M LiPF6 EC/PC/VC/MEC/DEC (2019/1/30/40) | | 0.1 | 69 |
| Ex. 5 | 1M LiPF6 EC/PC/VC/MEC/DEC (20/9/1/30/40) | | 1 | 75 |
| Ex. 6 | 1M LiPF6 EC/PC/VC/MEC/DEC (20/9/1/30/40) | | 4 | 72 |
| Ex. 7 | 1M LiPF6 EC/PC/FEC/MEC/DEC (20/5/5/30/40) | | 1 | 79 |

TABLE 2

| | Composition of electrolyte salt Composition of non-aqueous electrolytic solution (volume ratio of solvents) | Compound (I) formula | Content in non-aqueous electrolytic solution (% by mass) | Capacity retention ratio after high-temperature cycling (%) |
|---|---|---|---|---|
| Ex. 8 | 1M LiPF6 EC/PC/VC/MEC/DEC (20/9/1/30/40) | 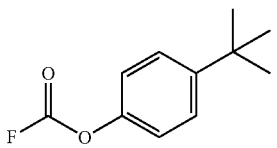 | 1 | 76 |
| Ex. 9 | 1M LiPF6 EC/PC/VC/MEC/DEC (20/9/1/30/40) | 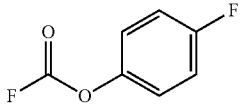 [SMILES: O=C(F)Oc1ccc(F)cc1] | 1 | 77 |
| Ex. 10 | 1M LiPF6 EC/PC/VC/MEC/DEC (20/9/1/30/40) | 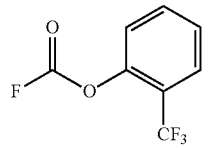 | 1 | 76 |
| Ex. 11 | 1M LiPF6 EC/PC/VC/MEC/DEC (20/9/1/30/40) | 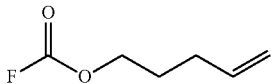 | 1 | 71 |
| Ex. 12 | 1M LiPF6 EC/PC/VC/MEC/DEC (20/9/1/30/40) | 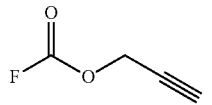 | 1 | 73 |

TABLE 2-continued

| | Composition of electrolyte salt Composition of non-aqueous electrolytic solution (volume ratio of solvents) | Compound (I) formula | Content in non-aqueous electrolytic solution (% by mass) | Capacity retention ratio after high-temperature cycling (%) |
|---|---|---|---|---|
| Ex. 13 | 1M LiPF6 EC/PC/VC/MEC/DEC (20/9/1/30/40) | F–C(=O)–O–cyclohexyl | 1 | 64 |
| Ex. 14 | 1M LiPF6 EC/PC/VC/MEC/DEC (20/9/1/30/40) | F–C(=O)–O–(CH2)4–O–C(=O)–F | 1 | 66 |
| Ex. 15 | 1M LiPF6 EC/PC/VC/MEC/DEC (20/9/1/30/40) | F–C(=O)–O–CH2–C≡C–CH2–O–C(=O)–F | 1 | 78 |
| Ex. 16 | 1M LiPF6 EC/PC/VC/MEC/DEC (20/9/1/30/40) | F–C(=O)–O–CH2CH2–O–CH2CH2–O–C(=O)–F | 1 | 68 |
| Ex. 17 | 1M LiPF6 EC/PC/VC/MEC/DEC (20/9/1/30/40) | F–C(=O)–O–cyclohexyl–O–C(=O)–F | 1 | 69 |
| Ex. 18 | 1M LiPF6 EC/PC/VC/MEC/DEC (20/9/1/30/40) | F–C(=O)–O–C6H4–O–C(=O)–F | 1 | 79 |
| Comp. Ex. 1 | 1M LiPF6 EC/PC/VC/MEC/DEC (20/9/1/30/40) | None | None | 51 |
| Comp. Ex. 2 | 1M LiPF6 EC/PC/VC/MEC/DEC (20/9/1/30/40) | H–C(=O)–O–C6H5 | 1 | 58 |
| Comp. Ex. 3 | 1M LiPF6 EC/PC/VC/MEC/DEC (20/9/1/30/40) | F–C(=O)–O–propyl | 1 | 55 |

Example 19 and Comparative Example 4

A positive electrode sheet was prepared in the same manner as in Example 1 and Comparative Example 1 except that, instead of the positive electrode active material used therein, $LiNi_{1/2}Mn_{3/2}O_4$ (positive electrode active material) was used. There were mixed 94% by mass of $LiNi_{1/2}Mn_{3/2}O_4$ coated with amorphous carbon and 3% by mass of acetylene black (conductive agent), and the mixture was added to and mixed with a solution prepared beforehand by dissolving 3% by mass of polyvinylidene fluoride (binder) in 1-methyl-2-pyrrolidone to prepare a positive electrode mixture paste. A laminate type battery was prepared and evaluation of the battery was conducted in the same manner as in Example 1 and Comparative Example 1 except that the above positive electrode mixture paste was coated on one surface of an aluminum foil (current collector), that the coated material was dried and subjected to a pressure treatment, and the material was cut into a predetermined size to prepare a positive electrode sheet, that the charge end voltage and the discharge end voltage at the time of battery evaluation were set at 4.9 V and 2.7 V, respectively, and that the composition of the non-aqueous electrolytic solution was changed to a specified one. The results were as shown in Table 3.

TABLE 3

| | Composition of electrolyte salt Composition of non-aqueous electrolytic solution (volume ratio of solvents) | Compound (I) formula | Content in non-aqueous electrolytic solution (% by mass) | Capacity retention ratio after high-temperature cycling (%) | Amount of gas generation after high-temperature cycling (%) |
|---|---|---|---|---|---|
| Ex. 19 | 1M LiPF6 FEC/MTFEC (35/65) | 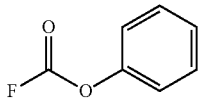 | 1 | 60 | 81 |
| Comp. Ex. 4 | | None | — | 50 | 100 |

Example 20 and Comparative Example 5

A negative electrode sheet was prepared in the same manner as in Example 1 except that, instead of the negative electrode active material used therein, lithium titanate $Li_4Ti_5O_{12}$ (negative electrode active material) was used. There were mixed 80% by mass of lithium titanate $Li_4Ti_5O_{12}$ and 15% by mass of acetylene black (conductive agent), and the mixture was added to and mixed with a solution prepared beforehand by dissolving 5% by mass of polyvinylidene fluoride (binder) in 1-methyl-2-pyrrolidone to prepare a negative electrode mixture paste. A laminate type battery was prepared and evaluation of the battery was conducted in the same manner as in Example 1 except that the above negative electrode mixture paste was coated on a copper foil (current collector), that the coated material was dried and subjected to a pressure treatment, and the material was cut into a predetermined size to prepare a negative electrode sheet, that the charge end voltage and the discharge end voltage at the time of battery evaluation were set at 2.8 V and 1.2 V, respectively, and that the composition of the non-aqueous electrolytic solution was changed to a specified one. The results were as shown in Table 4.

parative Example 2), and a compound described in the Patent Literature 2 is added (Comparative Example 3). Further, the same effect can be seen when lithium nickel manganate ($LiNi_{1/2}Mn_{3/2}O_4$) is used for the positive electrode from comparison of Example 19 and Comparative Example 4, and also when lithium titanate is used for the negative electrode from comparison of Example 20 and Comparative Example 4. Accordingly, it is evident that the effect of the present invention is not dependent upon specific positive electrode and negative electrode.

From the above, it has become clear that the effect obtained when the power storage device of the present invention is used at high temperature and high pressure is an effect characteristic of a case where the compound represented by general formula (I) is contained in the non-aqueous electrolytic solution.

Furthermore, the non-aqueous electrolytic solution of the present invention also has an effect of improving discharge characteristics when the lithium primary battery is used at high voltage.

The invention claimed is:
1. A non-aqueous electrolytic solution comprising at least a non-aqueous solvent, an electrolyte salt dissolved in the non-aqueous solvent, and a compound represented by general formula (I):

TABLE 4

| | Composition of electrolyte salt Composition of non-aqueous electrolytic solution (volume ratio of solvents) | Compound (I) formula | Content in non-aqueous electrolytic solution (% by mass) | Capacity retention ratio after high-temperature cycling (%) | Amount of gas generation after high-temperature cycling (%) |
|---|---|---|---|---|---|
| Ex. 20 | 1M LiPF6 PC/DEC (30/70) | 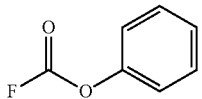 | 1 | 87 | 69 |
| Comp. Ex. | | None | — | 74 | 100 |

All the lithium ion rechargeable batteries of Examples 1 to 18 are improved in cycle characteristics at high temperature compared to the following lithium ion rechargeable batteries where, in the non-aqueous electrolytic solution of the present invention, the compound represented by general formula (I) is not added (Comparative Example 1), a compound described in the Patent Literature 1 is added (Com-

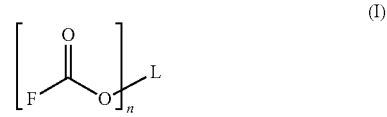
(I)

wherein
    n is an integer of 1 or 2; and
    when n is 1, L represents
        a straight or branched unsaturated hydrocarbon group that has 2 to 10 carbon atoms and of which at least one hydrogen atom is optionally substituted by a halogen atom,
        a cycloalkyl group that has 3 to 10 carbon atoms and of which at least one hydrogen atom is optionally substituted by a halogen atom, or
        an aryl group having 6 to 20 carbon atoms and of which at least one hydrogen atom is optionally substituted by a halogen atom; and
    when n is 2, L represents
        a saturated or unsaturated divalent hydrocarbon group that has 2 to 12 carbon atoms and optionally contains ether bond(s), or
        an arylene group that has 6 to 20 carbon atoms.

2. The non-aqueous electrolytic solution according to claim 1, wherein a content of the compound represented by general formula (I) is 0.001 to 10% by mass.

3. The non-aqueous electrolytic solution according to claim 1, wherein n is 1 and L represents a straight or branched C2-C10 alkenyl group, a straight or branched C2-10 alkynyl group, or a C3-10 cycloalkyl group, wherein these groups are optionally substituted by one or more halogen atoms selected from the group consisting of fluorine, chlorine, bromine, and iodine.

4. The non-aqueous electrolytic solution according to claim 1, wherein n is 1 and L represents a phenyl group which is optionally substituted by one or more straight or branched alkyl groups, wherein hydrogen atom(s) on a benzene ring of the phenyl group and hydrogen atom(s) on an alkyl group substituted on the benzene ring are optionally substituted by one or more halogen atoms selected from the group consisting of fluorine, chlorine, bromine, and iodine.

5. The non-aqueous electrolytic solution according to claim 1, wherein n is 2 and L represents a straight or branched C2-12 alkylene group, a straight or branched C2-12 alkenylene group, and a C2-12 alkynylene group, wherein these groups may contain ether bond(s).

6. The non-aqueous electrolytic solution according to claim 1, wherein n is 2 and L represents a cycloalkylene group having 2 to 12 carbon atoms.

7. The non-aqueous electrolytic solution according to claim 1, wherein n is 2 and L represents a phenylene group, a tolylene group (methylphenylene group), a dimthylphenylene group, a xylylene group (phenylene-bis-methylene group), a biphenylylene group, a naphthylene group, an anthrylene group, or a phenanthrylene group.

8. The non-aqueous electrolytic solution according to claim 1, wherein n is 2 and L represents a phenylene group or a naphthylene group which is optionally substituted by one or more straight or branched alkyl groups.

9. The non-aqueous electrolytic solution according to claim 1, wherein the non-aqueous solvent comprises one or at least two selected from the group consisting of cyclic carbonates and chain esters.

10. The non-aqueous electrolytic solution according to claim 9, wherein the cyclic carbonates is one or at least two selected from the group consisting of ethylene carbonate, propylene carbonate, 1,2-butylene carbonate, 2,3-butylene carbonate, 4-fluoro-1,3-dioxolan-2-one, trans- or cis-4,5-difluoro-1,3-dioxolan-2-one, vinylene carbonate, and vinylethylene carbonate.

11. The non-aqueous electrolytic solution according to claim 9, wherein the chain esters is one or at least two selected from the group consisting of asymmetric chain carbonates, symmetric chain carbonates, and chain carboxylic acid esters.

12. The non-aqueous electrolytic solution according to claim 11, wherein the asymmetric chain carbonates is one or at least two selected from the group consisting of methyl ethyl carbonate, methyl propyl carbonate, methyl isopropyl carbonate, methyl butyl carbonate, and ethyl propyl carbonate; the symmetric chain carbonate is one or at least two selected from the group consisting of dimethyl carbonate, diethyl carbonate, dipropyl carbonate, and dibutyl carbonate; and the linear carboxylic acid ester is one or at least two selected from the group consisting of pivalic acid esters such as methyl pivalate, ethyl pivalate, propyl pivalate, and the like, methyl propionate, ethyl propionate, methyl acetate, and ethyl acetate.

13. The non-aqueous electrolytic solution according to claim 9, wherein the chain esters is one or at least two methyl-containing chain esters selected from the group consisting of methyl ethyl carbonate, methyl propyl carbonate, methyl isopropyl carbonate, methyl butyl carbonate, dimethyl carbonate, methyl propionate, methyl acetate, and ethyl acetate.

14. The non-aqueous electrolytic solution according to claim 1, wherein the electrolyte salt contains one or at least two selected from $LiPF_6$, $LiPO_2F_2$, $Li_2PO_3F$, $LiBF_4$, $LiN(SO_2CF_3)_2$, $LiN(SO_2C_2F_5)_2$, $LiN(SO_2F)_2$, lithium difluorobis[oxalate-O,O']phosphate, and lithium tetrafluoro[oxalate-O,O']phosphate.

15. The non-aqueous electrolytic solution according to claim 1, which is used as a non-aqueous electrolytic solution for a power storage device comprising a positive electrode, a negative electrode, and a non-aqueous electrolytic solution containing an electrolyte salt dissolved in a non-aqueous solvent.

16. The non-aqueous electrolytic solution according to claim 15, wherein the power storage device is a lithium ion rechargeable battery.

17. The non-aqueous electrolytic solution according to claim 15, wherein the negative electrode comprises, as a negative electrode active material, one or at least two materials selected from lithium metal, lithium alloys, carbon materials capable of occluding and releasing lithium, tin, tin compounds, silicon, silicon compounds, and lithium titanate compounds.

18. The non-aqueous electrolytic solution according to claim 15, wherein the negative electrode is one comprising a carbon material.

19. The non-aqueous electrolytic solution according to claim 15, wherein the positive electrode is one comprising, as a positive electrode active material, a composite metal oxide of one or more metals selected from cobalt, manganese, and nickel with lithium, or lithium-containing olivine form of phosphoric acid salts containing one or more metals selected from iron, cobalt, nickel, and manganese.

20. A power storage device comprising at least a positive electrode, a negative electrode, and a non-aqueous electrolytic solution containing an electrolyte salt dissolved in a non-aqueous solvent, wherein the non-aqueous electrolytic solution is a non-aqueous electrolytic solution according to claim 1.

\* \* \* \* \*